US012059766B2

(12) United States Patent
Jeong

(10) Patent No.: US 12,059,766 B2
(45) Date of Patent: Aug. 13, 2024

(54) MACHINE TOOL AND OPERATION METHOD THEREFOR

(71) Applicant: DN SOLUTIONS CO., LTD., Changwon-si (KR)

(72) Inventor: Seonghoon Jeong, Gimhae-si (KR)

(73) Assignee: DN SOLUTIONS CO., LTD., Changwon-si (KR)

( * ) Notice: Subject to any disclaimer, the term of this patent is extended or adjusted under 35 U.S.C. 154(b) by 609 days.

(21) Appl. No.: 17/426,960

(22) PCT Filed: Feb. 11, 2020

(86) PCT No.: PCT/KR2020/001897
§ 371 (c)(1),
(2) Date: Jul. 29, 2021

(87) PCT Pub. No.: WO2020/166934
PCT Pub. Date: Aug. 20, 2020

(65) Prior Publication Data
US 2022/0097188 A1    Mar. 31, 2022

(30) Foreign Application Priority Data
Feb. 11, 2019   (KR) .................. 10-2019-0015771

(51) Int. Cl.
*B23Q 3/157*     (2006.01)
*B23Q 3/155*     (2006.01)

(52) U.S. Cl.
CPC ..... *B23Q 3/15713* (2013.01); *B23Q 3/15766* (2013.01); *B23Q 2003/155418* (2016.11);
(Continued)

(58) Field of Classification Search
CPC ............ B23Q 3/15713; B23Q 3/15766; B23Q 2003/155435; B23Q 2003/155446;
(Continued)

(56) References Cited

U.S. PATENT DOCUMENTS 4,358,888 A * 11/1982 Zankl ................ B23Q 3/15526
414/223.01
4,514,892 A * 5/1985 Tsujimura .......... B23Q 3/15706
483/66
(Continued)

FOREIGN PATENT DOCUMENTS

CH      654237 A  * 2/1986  .............. B23Q 1/66
EP    2191933 A1 * 6/2010  ........... B23Q 3/1554
(Continued)

OTHER PUBLICATIONS

International Search Report of PCT/KR2020/001897, May 18, 2020, English translation.

*Primary Examiner* — Sunil K Singh
*Assistant Examiner* — Michael Vitale
(74) *Attorney, Agent, or Firm* — STIP Law Group, LLC

(57) ABSTRACT

The present disclosure relates to a machine tool, such as a moving column-type machining center, and a method of operating the same, which are capable of shortening tool change time, improving productivity, minimizing a collision or mechanical interference, and increasing stability and reliability in a medium-sized or large-sized machine tool having a long length in a width direction by means of a magazine installed on a saddle, a tool changing unit movably installed on the saddle, and a tool changing unit transfer part configured to move the tool changing unit independently of a column.

17 Claims, 17 Drawing Sheets

(52) U.S. Cl.
CPC ............ *B23Q 2003/155446* (2016.11); *B23Q 3/15724* (2016.11); *Y10T 483/10* (2015.01); *Y10T 483/1771* (2015.01); *Y10T 483/1786* (2015.01)

(58) Field of Classification Search
CPC ............ Y10T 483/10; Y10T 483/1771; Y10T 483/1783; Y10T 483/1786
USPC .......................................... 483/1, 46, 51, 52
See application file for complete search history.

(56) References Cited

U.S. PATENT DOCUMENTS

| | | | | |
|---|---|---|---|---|
| 4,620,347 | A | * | 11/1986 | Stark .................. B23Q 3/15706 483/66 |
| 4,621,407 | A | * | 11/1986 | Suzuki .................. B23Q 1/015 408/35 |
| 6,740,839 | B1 | * | 5/2004 | Kung ........................ B23Q 1/72 219/69.11 |
| 7,097,603 | B2 | * | 8/2006 | Totsuka ............. B23Q 3/15526 483/1 |
| 7,322,916 | B2 | * | 1/2008 | Hazeyama ........... B23Q 3/1572 483/68 |
| 9,061,386 | B2 | * | 6/2015 | Tullmann ............. B23Q 37/002 |
| 2010/0173762 | A1 | * | 7/2010 | Tullmann ........... B23Q 3/15766 74/820 |
| 2013/0095988 | A1 | * | 4/2013 | Mayr ..................... B23Q 1/601 483/49 |
| 2014/0287897 | A1 | | 9/2014 | George |

FOREIGN PATENT DOCUMENTS

| | | | |
|---|---|---|---|
| JP | 63007246 A | * | 1/1988 |
| JP | H05253780 A | | 10/1993 |
| JP | 2000326171 A | | 11/2000 |
| JP | 2008000860 A | * | 1/2008 |
| JP | 2014012307 A | * | 1/2014 |
| KR | 20160092326 A | | 8/2016 |
| KR | 20160124503 A | | 10/2016 |

* cited by examiner

*710:711,712,713
*720:721,722,723
*730:731,732,733

MACHINE TOOL AND OPERATION METHOD THEREFOR

CROSS-REFERENCE TO RELATED APPLICATIONS

This application is the U.S. National Phase under 35 U.S.C. § 371 of International Application No. PCT/KR2020/001897 filed on Feb. 11, 2020, which in turn claims the benefit of Korean Application No. 10-2019-0015771 filed on Feb. 11, 2019, the disclosures of which are incorporated by reference into the present application.

FIELD OF THE DISCLOSURE

The present disclosure relates to a machine tool and a method of operating the same, and more particularly, to a machine tool, such as a moving column-type machining center, and a method of operating the same, which are capable of shortening tool change time and improving productivity by means of a magazine installed on a saddle, a tool changing unit movably installed on the saddle, and a tool changing unit transfer part configured to move the tool changing unit independently of a column.

BACKGROUND OF THE DISCLOSURE

In general, a machine tool refers to a machine used to process metal/non-metal workpieces in a desired shape and dimension using a suitable tool by using various types of cutting or non-cutting methods.

Various types of machine tools including a turning center, a vertical/horizontal machining center, a door-type machining center, a Swiss turning machine, an electric discharge machine, a horizontal NC boring machine, a CNC lathe, and a multi-tasking machining center are being widely used to suit the purpose of the corresponding work in various industrial sites.

The multi-tasking machining center, among the machine tools, refers to a turning center equipped with a multifunctional automatic tool changer (ATC) and a tool magazine in order to perform various types of processing such as turning, drilling, tapping, or milling. In the case of the multi-tasking machining center, an operator manually mounts a tool on a tool magazine when loading the tool required for a machining process or changing the tools.

In general, various types of currently used machine tools each have a control panel to which a numerical control (NC) technology or a computerized numerical control (CNC) technology is applied. The control panel is provided with a multifunctional switch or button, and a monitor.

In addition, the machine tool includes a table on which a material, i.e., a workpiece is seated and which transfers the workpiece to machine the workpiece, a palette used to prepare the workpiece to be machined, a spindle coupled to a tool or the workpiece and configured to be rotated, and a tailstock and a steady rest configured to support the workpiece during the machining process.

In general, the machine tool is provided with a transfer unit configured to transfer the table, a tool post, the spindle, the tailstock, and the steady rest along a transfer shaft in order to perform various types of machining operations.

Further, the machine tool uses a plurality of tools in order to perform various types of machining operations, and a tool magazine or a turret is used in the form of a tool storage place for receiving and storing the plurality of tools.

The machine tool uses the plurality of tools in order to perform various types of machining operations, and the tool magazine is used in the form of a tool storage place for receiving and storing the plurality of tools.

Further, the machine tool is generally equipped with an automatic palette changer (APC) in order to minimize the non-machining time. The automatic palette changer (APC) automatically changes the palettes between a workpiece machining region and a workpiece loading region. The workpiece may be mounted on the palette.

In addition, the machine tool is equipped with the automatic tool changer (ATC) configured to withdraw a specific tool from the tool magazine or remount the tool on the tool magazine based on an instruction of a numerical control unit in order to improve productivity of the machine tool.

In general, a machining center refers to a machine tool that has the automatic tool changer and changes various types of tools to perform various types of machining that may be performed by lathes, milling machines, drilling machines, boring machines, and the like. The machining center is mainly classified into a horizontal machining center and a vertical machining center in which a spindle is vertically mounted.

The vertical machining center may include a bed, a saddle installed above the bed, a table installed on the saddle and configured to allow a workpiece to be placed on the table, a column vertically mounted behind the bed, a spindle mounted on the column, a power transmission system configured to operate the spindle, and an electronic control system configured to control the operation of the spindle. The vertical machining center may further include an automatic tool changer, and a headstock configured to clamp a tool magazine and a tool.

In the case of a machine tool, particularly, a moving column-type machining center in the related art, the magazine and the automatic tool changer (ATC) are assembled with the bed, which is a fixed body, without a separate transfer system, such that the magazine and the ATC are always fixed to a lateral surface (a left surface or a right surface) of the machine tool.

In order to change the tools, the spindle, which performs the machining operations at various positions, needs to move to the fixed magazine and the fixed ATC to change the tools and then return to the machining positions, which causes problems of an increase in tool change time and non-machining time and a deterioration in productivity.

In addition, these problems are worse in a machine tool in the related art, particularly, a medium-sized or large-sized machine tool in which a stroke in a width direction (X-axis direction) is 2 m or more. That is, in the case in which the stroke in the width direction is as large as 2 m or more, the spindle needs to reciprocate in a section to the magazine and the ATC fixed to the lateral surface of the machine tool to change the tools, which causes a problem of the risk of interference and collision with the workpiece.

Moreover, the machine tool in the related art increases in size to reduce the risk of interference and collision, which causes problems of deterioration in spatial utilization, inconvenience caused by the heavy machine tool, and an increase in costs required to manufacture and maintain the machine tool.

Furthermore, in the case of the machine tool in the related art, the ATC needs to not only rotate, but also move upward and downward with respect to the spindle in order to change the tools, which causes problems of increases in size of the ATC, weight of the machine tool, and manufacturing costs.

DISCLOSURE

Summary

The present disclosure has been made in an effort to solve the above-mentioned problems, and an object of the present disclosure is to provide a machine tool, such as a moving column-type machining center, and a method of operating the same, which are capable of shortening tool change time, improving productivity, minimizing a collision or mechanical interference, and increasing stability and reliability in a medium-sized or large-sized machine tool having a long length in a width direction by means of a magazine installed on a saddle, a tool changing unit movably installed on the saddle, and a tool changing unit transfer part configured to move the tool changing unit independently of a column.

In order to achieve the above-mentioned objects, the present disclosure provides a machine tool including: a bed; a table installed on the bed and configured to allow a workpiece to be seated thereon; a saddle movably installed on the bed; a column movably installed on the saddle; a spindle movably installed on the column and configured to machine the workpiece; a magazine having a plurality of grippers that accommodates tools to supply the tool to the spindle and configured to store the tools in the grippers, respectively; and a transfer part configured to move the saddle, the column, and the spindle, in which the magazine is installed on the saddle and moves together with the saddle when the saddle moves.

In another exemplary embodiment of the machine tool according to the present disclosure, the machine tool may further include a tool changing unit movably installed on the saddle to replace a processing tool mounted on the spindle with a standby tool accommodated in the gripper of the magazine.

In another exemplary embodiment of the machine tool according to the present disclosure, the machine tool may further include a tool changing unit transfer part installed on the saddle to move the tool changing unit over the saddle.

In another exemplary embodiment of the machine tool according to the present disclosure, the machine tool may further include a control part configured to control operations of the magazine, the tool changing unit, the tool changing unit transfer part, and the transfer part to replace the processing tool mounted on the spindle with the standby tool accommodated in the gripper of the magazine.

In another exemplary embodiment of the machine tool according to the present disclosure, the control part may include: a machining program storage part configured to store a machining program for machining the workpiece; a tool changing unit position storage part configured to store an initial position, a standby position, and a change position of the tool changing unit; a spindle gripping position storage part configured to store a gripping position of the spindle in accordance with upward and downward movements of the spindle; and a tool change command part configured to transmit a tool change command in the sequence in which the workpiece is machined while communicating with the machining program storage part, the tool changing unit position storage part, and the spindle gripping position storage part.

In another exemplary embodiment of the machine tool according to the present disclosure, the control part may further include a determination part configured to determine whether the spindle normally clamps or unclamps the standby tool and the processing tool when changing the tools based on a signal from the tool change command part.

In another exemplary embodiment of the machine tool according to the present disclosure, the tool changing unit may be on standby at the initial position between an upper portion of the saddle and the column and the gripper of the magazine, which accommodates the standby tool to be used for a subsequent process based on the machining program, may be positioned at the standby position while the spindle machines the workpiece.

In another exemplary embodiment of the machine tool according to the present disclosure, the tool changing unit transfer part may rectilinearly reciprocate the tool changing unit between the standby position and the change position above the saddle through the column independently of the column.

In another exemplary embodiment of the machine tool according to the present disclosure, the tool changing unit may rectilinearly move and rotate above the saddle and the spindle may move upward and downward to unclamp the processing tool and clamp the standby tool in order to replace the processing tool mounted on the spindle with the standby tool accommodated in the gripper of the magazine.

In another exemplary embodiment of the machine tool according to the present disclosure, the tool changing unit transfer part may include: a fourth ball screw installed on an upper portion of the saddle through the column and disposed in a longitudinal direction of the saddle; a drive part configured to generate rotational power for the fourth ball screw; a bracket part installed to be movable along the fourth ball screw by an operation of the drive part; a fourth linear guide installed on the upper portion of the saddle through the column and disposed in the longitudinal direction of the saddle so as to be parallel to the fourth ball screw; and a fourth linear guide block installed to be movable along the fourth linear guide.

In another exemplary embodiment of the machine tool according to the present disclosure, the tool changing unit may include: a base part installed to be movable along the fourth linear guide by the fourth linear guide block and the bracket part; a power part installed on the base part and configured to generate rotational power; a shaft part configured to be rotated by the rotational power of the power part; and a change arm installed at one side of the shaft part so as to be rotatable in conjunction with the shaft part and configured to grip the tool accommodated in the magazine or mounted on the spindle by rectilinearly moving in the longitudinal direction above the saddle.

In another exemplary embodiment of the machine tool according to the present disclosure, the change arm may have a first gripping part and a second gripping part installed at two opposite ends of the change arm so as to face each other, the first gripping part may be configured to accommodate the standby tool, and the second gripping part may be configured to grip the processing tool.

In another exemplary embodiment of the machine tool according to the present disclosure, the shaft part and the power part may be installed to be orthogonal to each other, and the tool changing unit may further include a conversion part installed at the other side of the shaft part to transmit the rotational power from the power part to the shaft part.

In another exemplary embodiment of the machine tool according to the present disclosure, the transfer part may include: a saddle transfer part installed on the bed to move the saddle; a column transfer part installed on the saddle to move the column; and a spindle transfer part installed on the column to move the spindle.

In another exemplary embodiment of the machine tool according to the present disclosure, to replace the processing tool mounted on the spindle with the standby tool accommodated in the gripper of the magazine, the tool changing unit rectilinearly may move from the initial position to the standby position, the tool changing unit may be rectilinearly moved from the standby position to the change position by the tool changing unit transfer part in a state in which the first gripping part of the change arm grips the standby tool, the spindle may move downward to the gripping position so that the second gripping part of the change arm grips the processing tool, and the spindle may move upward after unclamping the processing tool.

In another exemplary embodiment of the machine tool according to the present disclosure, the change arm of the tool changing unit may rotate after the second gripping part of the change arm grips the processing tool on the spindle, the spindle may move downward to the gripping position to clamp the standby tool gripped by the first gripping part of the change arm and move upward after the tool changing unit moves to the standby position, and the tool changing unit may rectilinearly move from the change position to the standby position to return the processing tool, which is gripped by the second gripping part of the change arm, to the gripper of the magazine.

In another exemplary embodiment of the machine tool according to the present disclosure, the tool changing unit may rectilinearly move to the initial position after returning the processing tool, which is gripped by the second gripping part of the change arm, to the magazine, and the spindle may perform a subsequent process with the standby tool clamped by the spindle in the sequence of a machining program.

In order to achieve the above-mentioned objects, the present disclosure provides a method of operating a machine tool, the method including: storing a workpiece machining program for replacing a processing tool mounted on a spindle with a standby tool accommodated in a gripper of a magazine and storing an initial position, a standby position, and a change position of a tool changing unit and a gripping position of a spindle; machining a workpiece based on the machining program; placing the tool changing unit on standby at the initial position between an upper portion of the saddle and a column and positioning the gripper of the magazine, which accommodates the tool to be used for a subsequent process based on the machining program, at the standby position while the workpiece is machined based on the machining program; transmitting a tool change command to the magazine, a transfer part, and a tool changing unit transfer part in the sequence in which the workpiece is machined based on the machining program; rectilinearly moving the tool changing unit from the initial position to the standby position based on the tool change command, gripping, by a first gripping part of a change arm, the standby tool, and rectilinearly moving, by the tool changing unit transfer part, the tool changing unit to the change position; moving the spindle downward to the gripping position to allow a second gripping part of the change arm to grip the processing tool clamped by the spindle; moving the spindle upward after unclamping the processing tool to clamp the standby tool accommodated in the first gripping part of the change arm; rotating the change arm to transfer the standby tool, which is accommodated in the first gripping part of the change arm, to the spindle; moving the spindle downward again to the gripping position to clamp the standby tool accommodated in the first gripping part of the change arm; rectilinearly moving the tool changing unit to the standby position to return the processing tool, which is gripped by the second gripping part of the change arm, to the gripper of the magazine; moving the spindle upward again in a state in which the spindle clamps the standby tool; rectilinearly moving the tool changing unit to the initial position after returning the processing tool, which is gripped by the second gripping part of the change arm, to the magazine; and performing, by the spindle, the subsequent process with the standby tool clamped by the spindle in the sequence the machining program.

According to the machine tool and the method of operating the same according to the present disclosure, the movement time for changing the tools may be minimized, the tool change time may be reduced, and the productivity may be maximized in the medium-sized or large-sized machine tool having the long length in the width direction by means of the magazine installed on the saddle so as to move together with the saddle, the tool changing unit movably installed on the saddle, and the tool changing unit transfer part configured to move the tool changing unit independently of the column.

In addition, the machine tool and the method of operating the same according to the present disclosure may reduce the likelihood of interference or collision by minimizing the movement distance required to change the tools, thereby improving the stability and reliability of the machine tool.

Moreover, according to the machine tool and the method of operating the same according to the present disclosure, the respective constituent components may be small in size, and the entire machine tool may be small in size and light in weight, such that the spatial utilization may be maximized, and the maintenance and manufacturing costs are reduced.

Furthermore, according to the machine tool and the method of operating the same according to the present disclosure, the tool changing unit only rectilinearly reciprocates and rotates, and the spindle performs an inherent function of moving upward and downward in the height direction to change the tools. Therefore, the tool changing unit may be small in size, and the tool changing unit may quickly move, thereby reducing the non-machining time, reducing vibration and noise generated while the machine tool moves, increasing the lifespan of the machine tool, and maximizing the machining precision.

DESCRIPTION OF MAIN REFERENCE NUMERALS OF DRAWINGS

Figure 1:
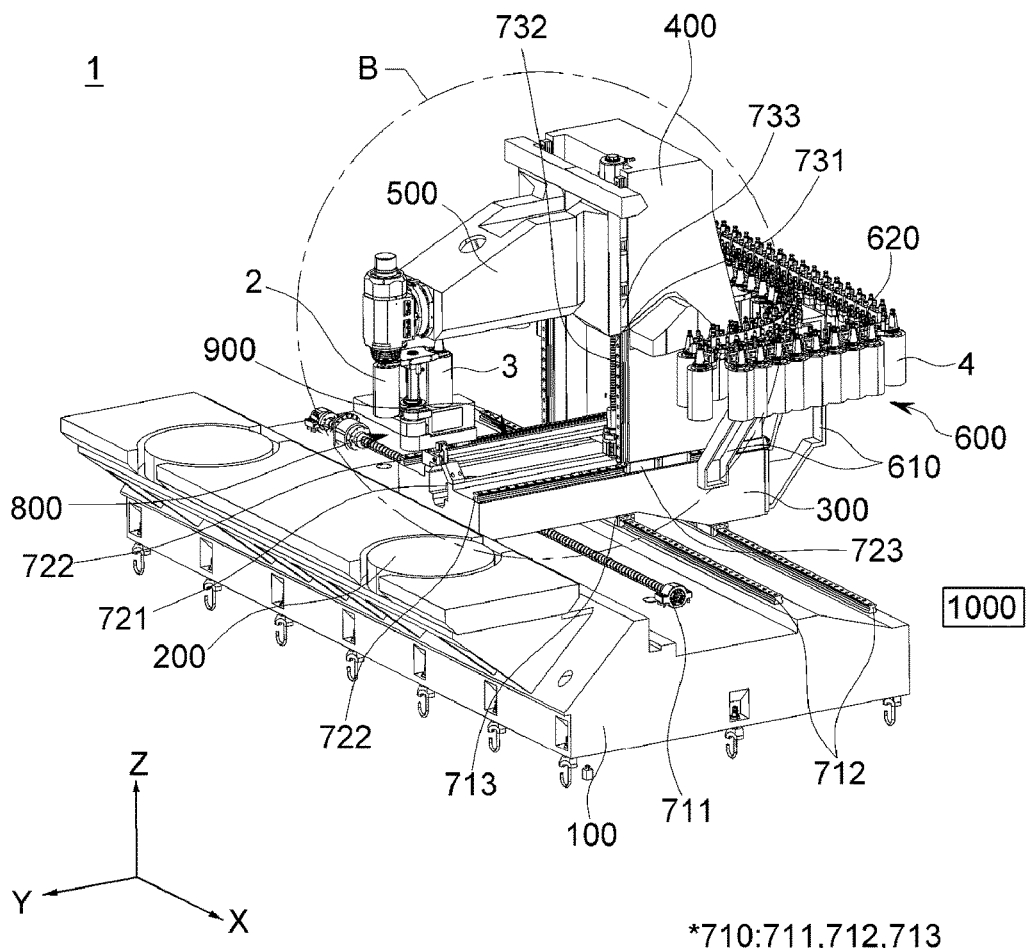
FIG. 1 is a perspective view illustrating a machine tool according to an embodiment of the present disclosure.

1: Machine tool
2: Processing tool
3: Standby tool
4: Tool
100: Bed
200: Table
300: Saddle
400: Column
500: Spindle
600: Magazine
700: Transfer part
710: Saddle transfer part
720: Column transfer part
730: Spindle transfer part
800: Tool changing unit
900: Tool changing unit transfer part
1000: Control part

DETAILED DESCRIPTION OF CERTAIN INVENTIVE EMBODIMENT

Hereinafter, a machine tool and a method of operating the same according to an embodiment of the present disclosure will be described in detail with reference to the drawings. The following exemplary embodiments are provided as examples for fully transferring the spirit of the present disclosure to those skilled in the art. Therefore, the present disclosure is not limited to the exemplary embodiments described below and may be specified as other aspects. Further, in the drawings, a size and a thickness of the apparatus may be exaggerated for convenience. Like reference numerals indicate like constituent elements throughout the specification.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Like reference numerals indicate like constituent elements throughout the specification. In the drawings, sizes and relative sizes of layers and regions may be exaggerated for clarity of description.

The terms used in the present specification are for explaining the exemplary embodiments, not for limiting the present disclosure. Unless particularly stated otherwise in the present specification, a singular form also includes a plural form. The terms such as "comprise (include)" and/or "comprising (including)" used in the specification do not exclude presence or addition of one or more other constituent elements, steps, operations, and/or elements, in addition to the mentioned constituent elements, steps, operations, and/or elements.

Figure 2:
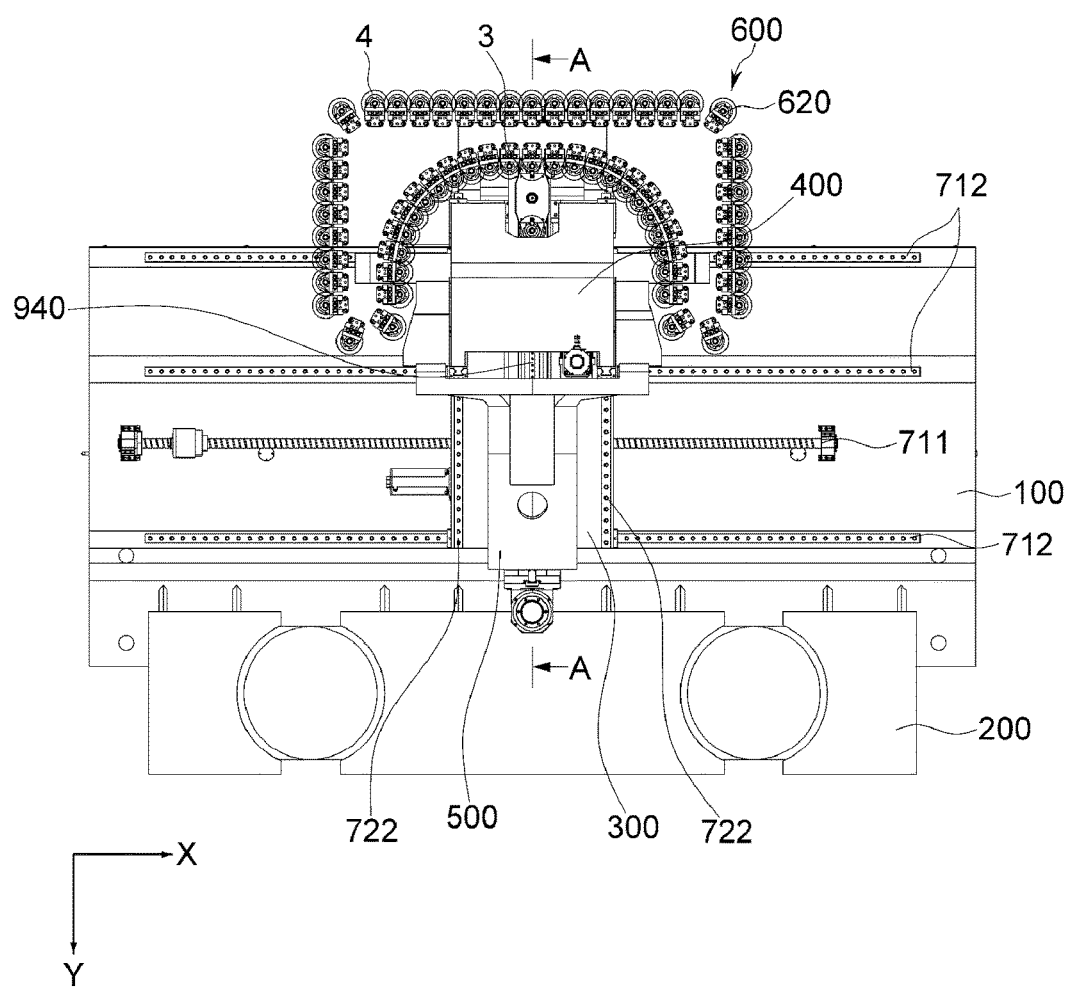
FIG. 2 is a top plan view illustrating the machine tool according to the embodiment of the present disclosure.
Figure 3:
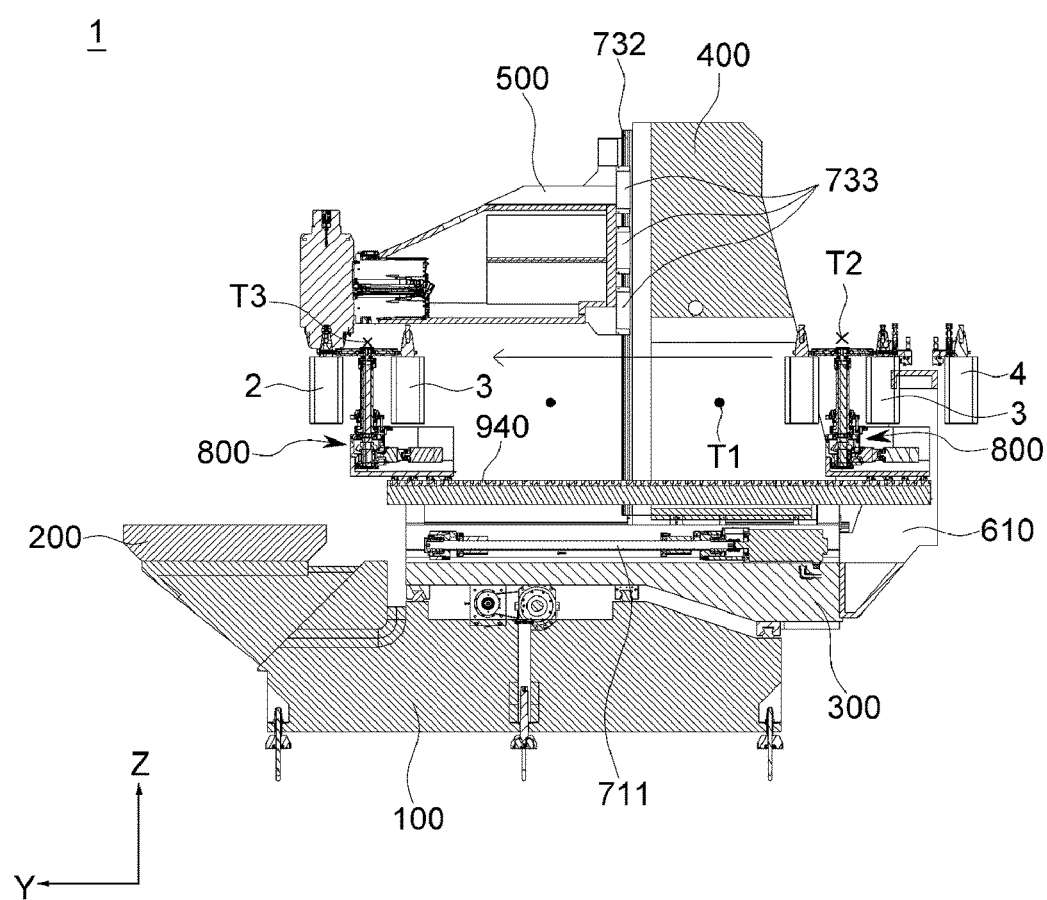
FIG. 3 is a conceptual view for explaining a movement of a tool changing unit.
Figure 4:
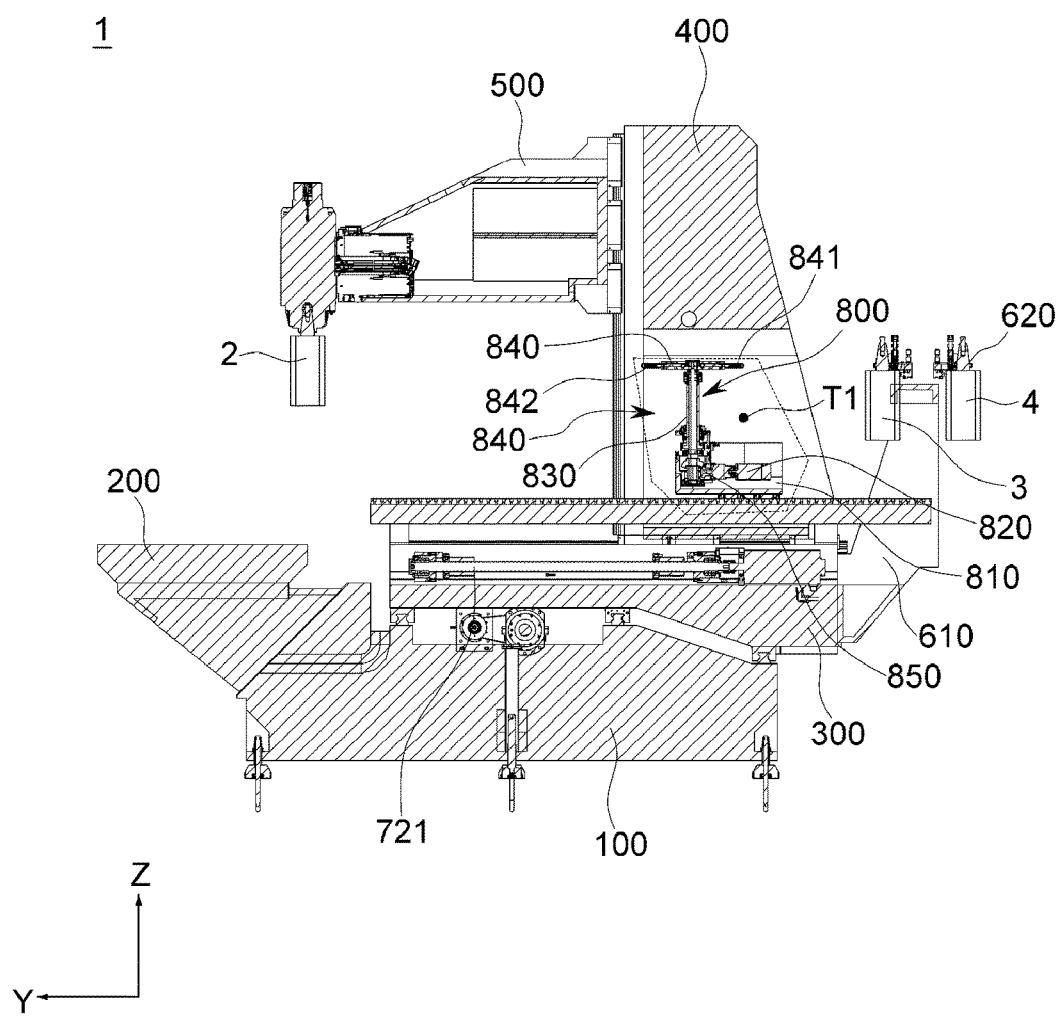
FIG. 4 is a cross-sectional view taken along line A-A in FIG. 2.
Figure 15:
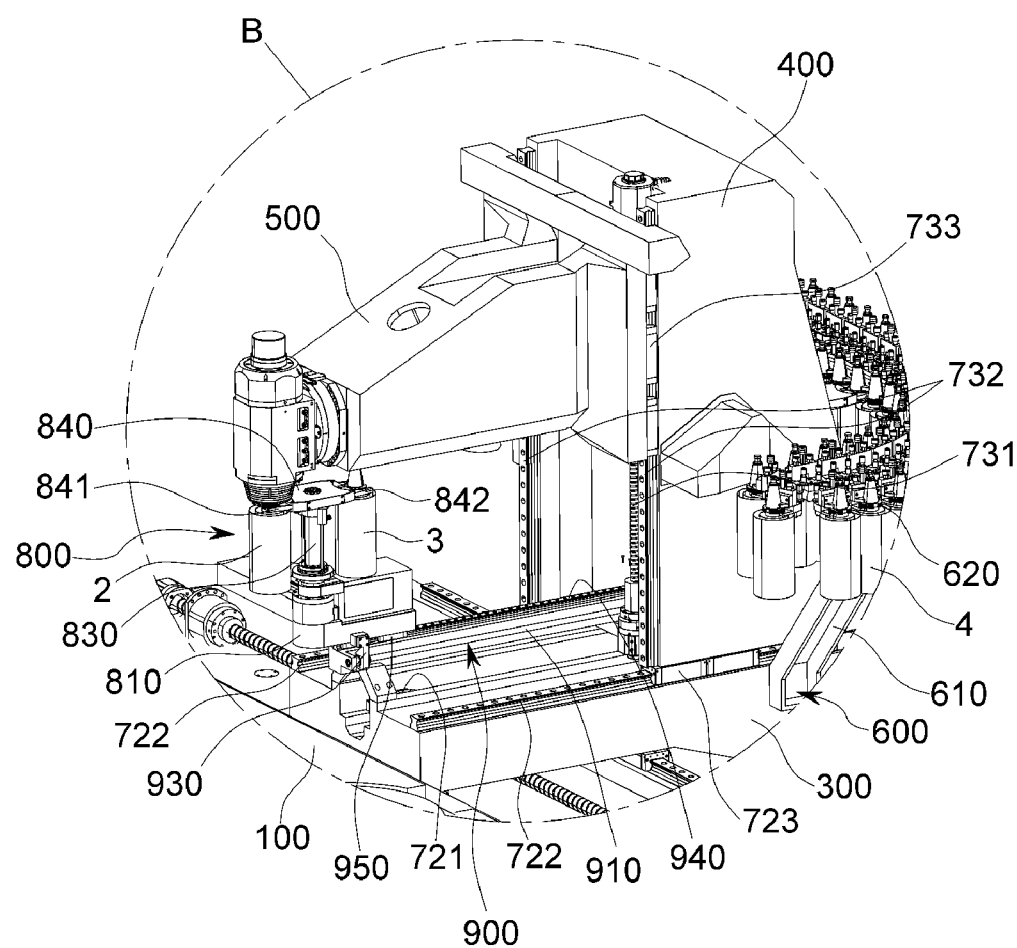
FIG. 15 is an enlarged view of part B illustrated in FIG. 1.
Figure 16:
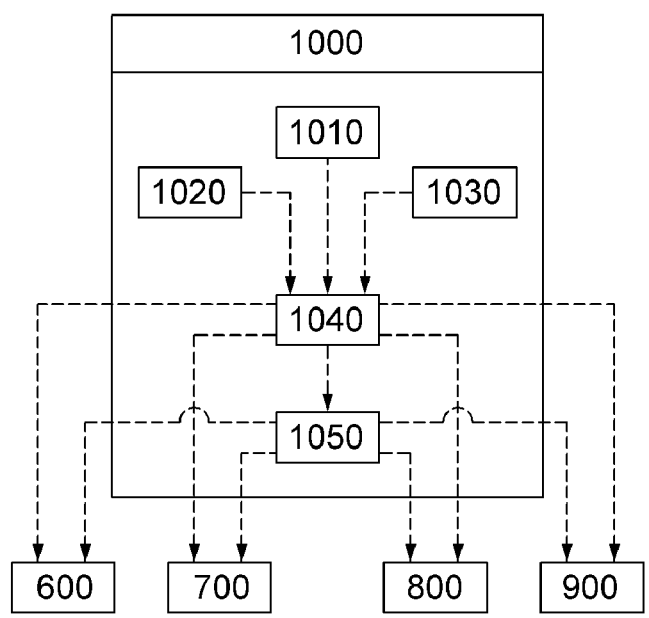
FIG. 16 is a configuration view illustrating a control unit of the machine tool according to the embodiment of the present disclosure.
Figure 17:
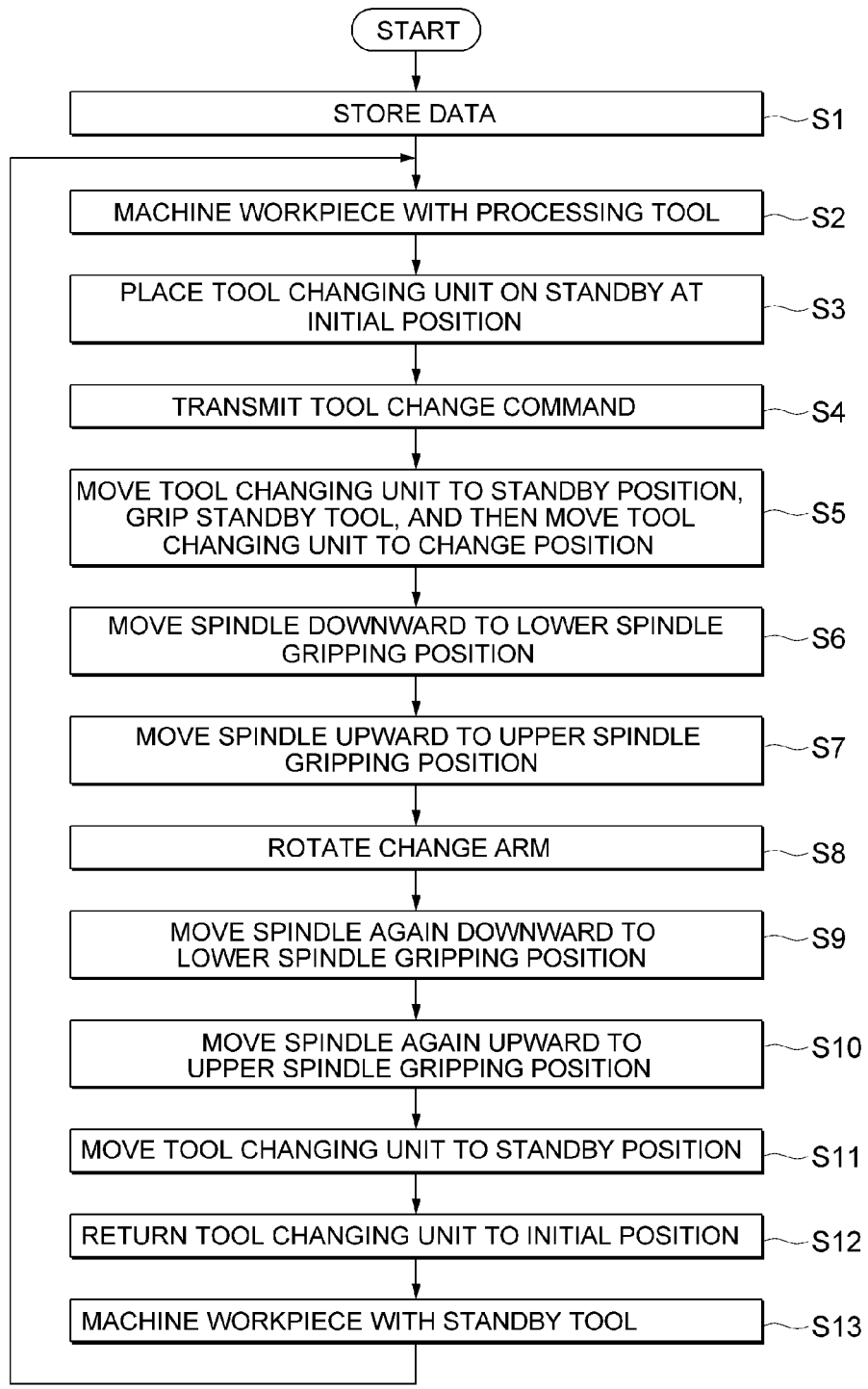
FIG. 17 is a flowchart illustrating a method of operating the machine tool according to the embodiment of the present disclosure.

FIG. 1 is a perspective view illustrating a machine tool according to the embodiment of the present disclosure, FIG. 2 is a top plan view illustrating the machine tool according to the embodiment of the present disclosure, and FIG. 3 is a conceptual view for explaining a movement of a tool changing unit. FIG. 4 is a cross-sectional view taken along line A-A illustrated in FIG. 2. FIGS. 5 to 14 are conceptual views illustrating a process of operating the machine tool according to the embodiment of the present disclosure. FIG. 15 is an enlarged view of part B illustrated in FIG. 1. FIG. 16 is a configuration view illustrating a control unit of the machine tool according to the embodiment of the present disclosure. FIG. 17 is a flowchart illustrating a method of operating the machine tool according to the embodiment of the present disclosure.

The terms used below are defined as follows. The term "width direction" means a horizontal direction on the same member, i.e., an X-axis direction in FIGS. 1 to 14, the term "longitudinal direction" means a vertical direction on the same member, i.e., a Y-axis direction in FIGS. 1 to 14 orthogonal to the width direction, and the term "height direction" means an upward/downward direction on the same member, i.e., a Z-axis direction in FIGS. 1 to 14 orthogonal to the width direction and the longitudinal direction. In addition, the term "upward (upper)" means an upward direction in the "height direction," i.e., a direction toward an upper side in the Z-axis direction in FIGS. 1 to 15, and the term "downward (lower)" means a downward direction in the "height direction," i.e., a direction toward a lower side in the Z-axis direction in FIGS. 1 to 15. In addition, the term "upward movement" means a movement toward an upper side in the Z-axis direction, which is the height direction in FIGS. 1 to 15, and the term "downward direction" means a movement toward a lower side in the Z-axis direction, which is the height direction in FIGS. 1 to 15. In addition, the term "inward (inner)" means a side relatively close to a center of the same member, i.e., the inside in FIGS. 1 to 14, and the term "outward (outer)" means a side relatively distant from the center of the same member, i.e., the outside in FIGS. 1 to 14. In addition, the term "forward (front)" means a side close to a table, and the term "rearward (rear)" means a side close to a magazine.

A machine tool 1 according to an embodiment of the present disclosure will be described with reference to FIGS. 1 to 16. As illustrated in FIG. 1, the machine tool 1 according to the embodiment of the present disclosure includes a bed 100, a table 200, a saddle 300, a column 400, a spindle 500, a magazine 600, and a transfer part 700.

The bed 100 is installed on a ground surface or a base. The bed 100 serves as a support for supporting a workpiece to be machined and provides a space in which components required to machine the workpiece are installed.

The table 200 is installed on an upper portion of the bed 100, and the workpiece is seated on the table 200. The table 200 may be provided as a stationary or rotary table, but the present disclosure is not necessarily limited thereto. That is, the table 200 may rotate and move in a vertical direction, a horizontal direction, and a height direction on the upper portion of the bed 100, as necessary.

The bed 100 and the table 200 may be provided to have a stroke of 2 m or more in a width direction.

The saddle 300 is movably installed on the upper portion of the bed 100. The saddle 300 is installed on the upper portion of the bed 100 so as to be adjacent to the table 200. In addition, as illustrated in FIG. 1, the saddle 300 may be moved in the width direction (X-axis direction) on the upper portion of the bed 100 by the transfer part 700, i.e., a saddle transfer part 710 installed on the bed 100. In addition, the saddle 300 is disposed on the upper portion of the bed 100 and serves to support the column 400.

The column 400 is movably installed on an upper portion of the saddle 300. The column 400 is installed above the saddle 300 in the height direction, but the present disclosure is not necessarily limited thereto. That is, as illustrated in FIG. 1, the column 400 may move in a longitudinal direction (Y-axis direction) on the upper portion of the saddle 300 by the transfer part 700, i.e., a column transfer part 720 installed on the saddle 300.

The spindle 500 is movably installed on the column 400 and rotates a processing tool 2 clamped to machine the workpiece. That is, as illustrated in FIG. 1, the spindle 500 may move in the height direction (Z-axis direction) along one side of the column 400 by the transfer part 700, i.e., a spindle transfer part 730 installed on the column 400. Specifically, the spindle 500 may be configured as a spindle head on which a Z-axis slide and a main shaft are mounted to be movable in the height direction along the column 400.

The magazine 600 accommodates a plurality of tools and supplies the spindle with the tool most suitable for the machining operation in accordance with a machining program or a machining state of the machine tool or an operator. That is, the magazine 600 has a plurality of grippers 620 capable of accommodating the tools 4 and supplying the tools 4 to the spindle 500. The grippers 620 each store the corresponding tool 4. The grippers 620 are installed to be rotatable along a frame of the magazine 600 by a separate drive device (servo motor).

As illustrated in FIG. 1, the magazine 600 is installed on the saddle 300 by a support frame 610 and moves in the X-axis direction together with the saddle 300 when the saddle 300 is moved in the X-axis direction by the saddle transfer part 710.

The transfer part 700 serves to move the saddle 300, the column 400, and the spindle 500. As illustrated in FIGS. 1 to 3 and 15, the transfer part 700 includes the saddle transfer part 710, the column transfer part 720, and the spindle transfer part 730.

The saddle transfer part 710 is installed on the bed 100 to move the saddle 300. Specifically, the saddle transfer part 710 includes a first ball screw 711, first linear guides 712, and first linear guide blocks 713.

The first ball screw 711 is installed on the upper portion of the bed 100 and disposed in the width direction. The first linear guides 712 are disposed on the upper portion of the bed 100 so as to be spaced apart from each other in the longitudinal direction (Y-axis direction), with the first ball screw 711 interposed therebetween, and extends in the width direction (X-axis direction). As illustrated in FIG. 1, the first linear guides 712 may be installed on an upper-end surface of the bed 100 and disposed at different heights in the height direction (Z-axis direction) to stably support the saddle 300. That is, the first linear guides 712 may be installed on the upper-end surface of the bed 100 and disposed on two stages so as to have a level difference in the height direction. The first linear guide blocks 713 are installed on the first linear guides 712 so as to be movable in the first linear guides 712. In addition, the plurality of first linear guide blocks 713 is coupled to the saddle 300 and installed on the first linear guides 712. The plurality of first linear guide blocks 713 serves to support the saddle 300 while moving the saddle 300 in the X-axis direction.

The column transfer part 720 is installed on the upper portion of the saddle 300 to move the column 400. Specifically, the column transfer part 720 includes a second ball screw 721, second linear guides 722, and second linear guide blocks 723.

The second ball screw 721 is installed on the upper portion of the saddle 300 and disposed in the longitudinal direction (Y-axis direction). The second linear guides 722 are installed at two opposite sides on the upper portion of the saddle 300 so as to be spaced apart from each other in the width direction (X-axis direction) with the second ball screw 721, a fourth ball screw 910 and a fourth linear guide 940, which will be described below, interposed therebetween and extends in the longitudinal direction (Y-axis direction). The second linear guide blocks 723 are installed on the second linear guides 722 so as to be movable along the second linear guides 722. In addition, the plurality of second linear guide blocks 723 is coupled to the column 400 and installed on the second linear guides 722. The plurality of second linear guide blocks 723 serves to support the column 400 while moving the column 400 in the Y-axis direction.

The spindle transfer part 730 is installed at one side of the column 400 to move the spindle 500. Specifically, the spindle transfer part 730 includes a third ball screw 731, third linear guides 732, and third linear guide blocks 733.

The third ball screw 731 is installed at one side of the column 400 and disposed in the height direction (Z-axis direction). The third linear guides 732 are installed at two opposite ends of one side of the column 400 and spaced apart from in the width direction (X-axis direction) with the third ball screw 731 interposed therebetween and extends in the height direction (Z-axis direction). The third linear guide blocks 733 are installed on the third linear guides 732 so as to be movable in the third linear guides 732. In addition, the plurality of third linear guide blocks 733 are coupled to the spindle 500 and installed on the third linear guides 732. The plurality of third linear guide blocks 733 serves to support the spindle 500 while moving the spindle 500 in the Z-axis direction.

The first linear guide 712, the second linear guide 722, and the third linear guide 732 each may be provided as an LM guide rail.

In addition, as illustrated in FIGS. 1 to 15, the machine tool 1 according to the embodiment of the present disclosure further includes a tool changing unit 800 and a tool changing unit transfer part 900.

The tool changing unit 800 is movably installed on the saddle 300 to replace the processing tool 2 mounted on the spindle 500 with a standby tool 3 accommodated in the gripper 620 of the magazine 600.

The tool changing unit transfer part 900 is installed on the saddle 300 in order to move the tool changing unit 800 in the longitudinal direction (Y-axis direction) on the saddle 300.

The tool changing unit transfer part 900 may move the tool changing unit 800 over the saddle 300 through the column 400 independently of the column transfer part 720 for moving the column 400. The tool changing unit transfer part 900 may freely and rectilinearly reciprocate the tool changing unit 800 between an initial position T1 defined above the saddle 300 between the saddle 300 and the column 400, a standby position T2 adjacent to a standby port of the magazine 600, and a change position T3 adjacent to the spindle.

That is, since the tool changing unit 800 may be rectilinearly reciprocated in the longitudinal direction (Y-axis direction) by the tool changing unit transfer part 900 independently of the column 400, the spindle 500 may move independently of the column 400 to change the tools, thereby quickly and conveniently changing the tools without unnecessarily moving the spindle 500 coupled to the column 400.

As described above, the machine tool according to the present disclosure may change the tools without moving the spindle to the magazine in the medium-sized or large-sized machine tool having a long length in the width direction by means of the magazine installed on the saddle, the tool changing unit movably installed on the saddle, and the tool changing unit transfer part configured to move the tool changing unit independently of the column. Therefore, it is possible to minimize the movement time for changing the tools, reduce tool change time, and thus maximize productivity.

As illustrated in FIGS. 3 to 14, in order to replace the processing tool 2 mounted on the spindle 500 with the standby tool 3 accommodated in the gripper 620 of the magazine 600 in the machine tool 1 according to the embodiment of the present disclosure, the tool changing unit 800 only rectilinearly moves in the longitudinal direction (Y-axis direction) above the saddle 300 without moving upward or downward (in the height direction (Z-axis direction)), and a change arm 840 only rotates. The spindle 500 moves upward and downward in the height direction between an upper gripping line G1 and a lower gripping line G2, such that the processing tool 2 is unclamped from the spindle 500 and the change arm 840 clamps the standby tool 3 accommodated in a first gripping part 841. That is, the upward and downward movements necessarily required to load and unload the tool into/from the spindle may be performed by the spindle instead of the tool changing unit. This is implemented by a structure in which the tool is loaded or unloaded into/from the gripper of the magazine in a direction perpendicular to the tool axis. In addition, the first gripping part and a second gripping part of the change arm of the tool changing unit, which will be described below, may grip a flange portion of the tool to be loaded or unloaded in the direction of the tool axis only by being reciprocated in the longitudinal direction by the tool changing unit transfer part.

As a result, by the tool changing unit movably installed on the saddle and the tool changing unit transfer part configured to move the tool changing unit independently of the column, the gripper grips the tool while avoiding the flange portion of the tool so that the standby tool accommodated in the gripper of the magazine is loaded or unloaded in the direction perpendicular to the tool axis at the time of changing the tools. The first or second gripping part of the change arm is structured to directly grip the flange portion of the tool. As a result, it is possible to quickly change the tools at the spindle and the gripper of the magazine simply by reciprocating the tool changing unit rectilinearly by the tool changing unit transfer part without moving the change arm of the tool changing unit upward and downward.

As described above, since the tool changing unit only rectilinearly reciprocates and rotates and the spindle moves upward and downward to load and unload the tool into/from the spindle, a separate configuration for moving the tool changing unit upward and downward may be minimized, the tool changing unit may be light in weight and have a small size, the entire machine tool may be compact, and the spatial utilization may be maximized. In addition, the reduction in size of the tool changing unit enables the tool changing unit to quickly reciprocate between the initial position, the standby position, and the change position, thereby minimizing non-machining time and maximizing productivity.

As illustrated in FIGS. 1 and 15, the tool changing unit transfer part 900 of the machine tool according to the embodiment of the present disclosure includes a fourth ball screw 910, a drive part 920, a bracket part 930, a fourth linear guide 940, and fourth linear guide blocks 950.

The fourth ball screw 910 is installed on the upper portion of the saddle 300 so as to move through the column 400 and disposed in the longitudinal direction (Y-axis direction) of the saddle 300.

The drive part 920 applies rotational power to the fourth ball screw 910 based on a tool change instruction signal generated from a control part 1000. The drive part 920 may include a servo motor, but the present disclosure is not necessarily limited thereto.

The bracket part 930 is installed to be movable along the fourth ball screw 910 by the operation of the drive part 920. One side of the bracket part 930 is connected to a base part 810 of the tool changing unit 800, and the bracket part 930 serves to stably support the tool changing unit 800 and minimize the generation of vibration when the tool changing unit 800, together with the fourth linear guide blocks 950, moves in the longitudinal direction above the saddle 300 independently of the column.

The fourth linear guide 940 is installed above the saddle 300 so as to move through the column 400 and disposed in the longitudinal direction (Y-axis direction) of the saddle 300 so as to be parallel to the fourth ball screw 910. The fourth linear guide 940 may be provided as an LM guide rail.

The fourth linear guide blocks 950 are installed to be movable along the fourth linear guide 940. The plurality of fourth linear guide blocks 950 is coupled to the tool changing unit 800 and installed on the fourth linear guide 950. The plurality of fourth linear guide blocks 950 serves to support the tool changing unit 800 while moving the tool changing unit 800 in the Y-axis direction.

As illustrated in FIGS. 1 to 14, the tool changing unit 800 of the machine tool 1 according to the embodiment of the present disclosure includes the base part 810, a power part 820, a shaft part 830, and the change arm 840.

The base part 810 is installed to be movable in the longitudinal direction (X-axis direction) above the saddle along the fourth linear guide 940 by the fourth linear guide blocks 950 and the bracket part 930.

The power part 820 is installed in the base part 810 and generates rotational power. The power part 820 may include a servo motor, but the present disclosure is not necessarily limited thereto.

The shaft part 830 is rotated by the rotational power from the power part 820.

The change arm 840 is installed at one side of the shaft part 830 so as to be rotatable in conjunction with the shaft part. In addition, the change arm 840 rectilinearly moves in the longitudinal direction (Y-axis direction) above the saddle 300 and grips the standby tool accommodated in the magazine 600 or the processing tool mounted on the spindle 500.

In addition, the change arm 840 has the first gripping part 841 and the second gripping part 842 installed to face each other and disposed at two opposite ends of the change arm 840. The first gripping part 841 serves to accommodate the standby tool 3, and the second gripping part 842 serves to grip the processing tool. That is, as the change arm 840 is simply moved rectilinearly in the longitudinal direction (Y-axis direction) above the saddle 300 by the tool changing unit transfer part 900, the first gripping part 841 of the change arm 840 accommodates the standby tool 3, and the second gripping part 842 grips the processing tool 2.

The change arm 840 may have a plurality of gripping parts installed to face one another and spaced apart from one another at predetermined angles with respect to a rotation center of the shaft part 830, but the present disclosure is not necessarily limited thereto. That is, although not illustrated in the drawings, in a case in which the change arm has three gripping parts, the three gripping parts are installed at an angle of 120 degrees with respect to the rotation center of the shaft part. In a case in which the change arm has four gripping parts, the four gripping parts are installed at an angle of 90 degrees with respect to the rotation center of the shaft part. Therefore, one of the gripping parts may be on standby at the initial position while gripping in advance the standby tool to be used in a subsequent machining process in accordance with the machining program, and thus the change arm 840 may move to the change position and change the tools without reciprocally moving to the standby position, thereby further reducing the tool change time and maximizing the productivity. That is, as necessary, the gripping part of the change arm may have various shapes. In addition, the gripping parts are installed to face one another and spaced apart from one another at predetermined angles with respect to the rotation center of the shaft, which makes it possible to prevent the tools from separating from the plurality of gripping parts when the plurality of gripping parts rectilinearly reciprocates or rotates in the state in which the plurality of gripping parts accommodates the tools.

As described above, the machine tool and the method of operating the same according to the present disclosure may reduce the likelihood of interference or collision by minimizing the movement distance required to change the tools, thereby improving the stability and reliability of the machine tool.

As illustrated in FIGS. 1 to 14, the tool changing unit 800 of the machine tool 1 according to the embodiment of the present disclosure may further include a conversion part 850.

The tool changing unit 800 includes the conversion part 850 installed between the other side of the shaft part 830 and the power part 820 to transmit the rotational power from the power part 820 to the shaft part 830 in the state in which the shaft part 830 is installed to be orthogonal to the power part 820. The conversion part 850 may include a bevel gear, but the present disclosure is not necessarily limited thereto. That is, a first gear may be installed at the other side of the shaft part 830, and a second gear may be installed at a tip of a rotary shaft of the power part 820 so as to mesh with the first gear in the state in which the first gear and the second gear are orthogonal to each other.

As described above, since the conversion part 850 of the tool changing unit 800 converts the power from the power part and transmits the resultant power, the tool changing unit 800 may be small in size and light in weight so that the tool changing unit 800 may move above the saddle while minimizing interference with the column. Therefore, the entire machine tool may be compact, the spatial utilization may be maximized, and the maintenance and manufacturing costs may be reduced.

As illustrated in FIGS. 1 and 16, the machine tool according to the embodiment of the present disclosure may further include the control part 1000. In addition, the control part 1000 may include a machining program storage part 1010, a tool changing unit position storage part 1020, a spindle gripping position storage part 1030, a tool change command part 1040, and a determination part 1050.

The control part 1000 controls the operations of the magazine 600, the tool changing unit 800, the tool changing unit transfer part 900, and the transfer part 700 including the saddle transfer part 710, the column transfer part 720, and the spindle transfer part 730 in order to replace the processing tool 2 mounted on the spindle 500 with the standby tool 3 accommodated in the gripper 620 of the magazine 600.

In addition, although not illustrated in the drawings, according to the exemplary embodiment of the present disclosure, the control part includes a main operation part. The main operation part includes a screen display program and a data input program in accordance with a selection of a screen display and performs a function of displaying a software switch on a display screen in accordance with an output of the screen display program and a function of recognizing an ON/OFF state of the software switch and making an instruction about an input and an output for an operation of the machine.

In addition, the main operation part has a monitor installed in or at one side of a housing or a casing of the machine tool and capable of displaying multifunctional switches or buttons and various types of information, but the present disclosure is not necessarily limited thereto.

The machining program for machining the workpiece is stored in the machining program storage part 1010. That is, the machining program storage part 1010 provides a human-machine interface that allows the operator to input the machining program for machining the workpiece. The operator inputs one or more workpiece machining programs by using the machining program storage part 1010.

In addition, the machining program storage part 1010 includes a numerical control part. The numerical control part receives the machining program stored in the machining program storage part 1010, inputs parameters for machining the workpiece, and creates machining routes. The numerical control part includes numerical control (NC) or computerized numerical control (CNC) and is embedded with various types of numerical control programs. That is, the numerical control part is embedded with programs for driving the power part, the drive part, a drive unit of the transfer part, and a drive unit of the magazine, and a program for driving the tool. The corresponding program is automatically loaded and executed in accordance with the operation of the numerical control part. The numerical control part communicates, through predetermined protocols, with the machining program storage part 1010, the tool changing unit position storage part 1020, the spindle gripping position storage part 1030, the tool change command part 1040, the determination part 1050, and a PLC.

In addition, the machining program storage part 1010 stores reference values in relation to the number of tools and the sequence of the tools required to machine the workpiece in accordance with the machining program stored in the machining program storage part 1010. The reference values may be changed depending on types of workpieces, the number of grippers installed in the magazine, sizes of workpieces, the number of spindles installed in a spindle head unit, and a spacing distance between the spindles. The reference values may be designated by the operator through an input part, as necessary. The reference values may be automatically calculated and stored in accordance with the corresponding data and the machining program. Therefore, the gripper, which grips the tool to be used in the subsequent process, may be positioned at the standby position, thereby minimizing the tool change time.

The tool changing unit position storage part 1020 stores the initial position T1, the standby position T2, and the change position T3 of the tool changing unit.

The spindle gripping position storage part 1030 stores gripping positions G1 and G2 of the spindle, which are set by the upward and downward movements in the height direction of the spindle 500. At the gripping positions G1 and G2, the spindle clamps the standby tool 3 accommodated in the first gripping part 841 of the change arm or the second gripping part 842 of the change arm grips the processing tool 2 mounted on the spindle. The data stored in the spindle gripping position storage part 1030 include two values in relation to an upper spindle gripping position G1 and a lower spindle gripping position G2. However, various positions may be stored depending on sizes and types of tools.

The tool change command part 1040 transmits a tool change command in accordance with the sequence of machining the workpiece while communicating with the machining program storage part 1010, the tool changing unit position storage part 1020, and the spindle gripping position storage part 1030.

Based on the command signal from the tool change command part, a tool changing part changes the tools by operating the transfer part, the tool changing unit transfer part, and the magazine.

The determination part 1050 determines whether the spindle 500 normally clamps or unclamps the standby tool 3 and the processing tool 2 at the time of changing the tools based on the signal from the tool change command part 1040. When there occurs abnormality, the determination part 1050 transmits a signal to the control part. The control part displays the abnormality to the outside through a monitor or the like to notify the operator or the user of the abnormality of the machine tool, thereby preventing malfunction.

In addition, the tool changing part may include the PLC (programmable logic controller), but the present disclosure is not necessarily limited thereto. The PLC communicates with the machining program storage part 1010, the tool change position storage part 1020, the spindle gripping position storage part 1030, the tool change command part 1040, the determination part 1050, the transfer part 700, the tool changing unit transfer part 900, and the magazine 600 through predetermined protocols and executes a control instruction through the communication. That is, the PLC operates by receiving a control instruction based on a control program for the numerical control part or the control part 1000. In addition, particularly, the PLC may measure rotational speeds and torque by using encoders of the drive part and the power part or encoders of the transfer part and the drive unit of the magazine. Therefore, the PLC may detect the current positions of the tools accommodated in the plurality of grippers of the magazine, thereby allowing the gripper gripping the standby tool to be used for the subsequent process to automatically move to the standby position in accordance with the machining program or allowing the gripper, which accommodates the processing tool to be returned from the spindle, to automatically move to the standby position during the process of replacing the processing tool mounted on the spindle with the standby tool. The drive unit of the magazine includes a motor or a servo motor, and the operation of the drive unit of the magazine is controlled by the PLC and the control part, but the present disclosure is not necessarily limited thereto.

In addition, although not illustrated in the drawings, the control part 1000 of the machine tool according to the embodiment of the present disclosure may further include an input part and a display part.

The input part may be installed in the form of a switch or a touch button on a control panel, thereby allowing the operator to easily input the initial position, the standby position, the change position, the spindle gripping position, and the like.

The display part may display a result of the determination part 1050 of the control part 1000, the current position of the tool changing unit, the position of the spindle, the number of the tool disposed at the standby position, the currently executed machining program, and the like. Therefore, the operator may check the current state of the machine tool with the naked eye and thus determine and check whether the machine tool is normal or abnormal, thereby reducing maintenance costs and preventing a safety accident.

In addition, when the determination result of the determination part indicates that the spindle does not normally clamp or unclamp the tool, the display part may display an alarm and warn the operator, thereby preventing a waste of workpieces and preventing the tool from being damaged or broken. In this case, the alarm may be displayed on a monitor or indicated in the form of alarm sound or warning light. The display part may include an LCD, LED, or PDP monitor or the like, but the present disclosure is not necessarily limited thereto.

An operational principle for changing the tools in the machine tool according to the embodiment of the present disclosure will be described with reference to FIGS. 3 to 14.

As illustrated in FIG. 4, during the process of machining a workpiece with the processing tool 2 on the spindle 500, the tool changing unit 800 is initially on standby at the initial position T1 between the upper portion of the saddle 300 and the column 400.

In this case, the gripper of the magazine, which accommodates the standby tool 3 to be used for the subsequent process in accordance with the machining program, is positioned at the standby position T2.

Figure 5:
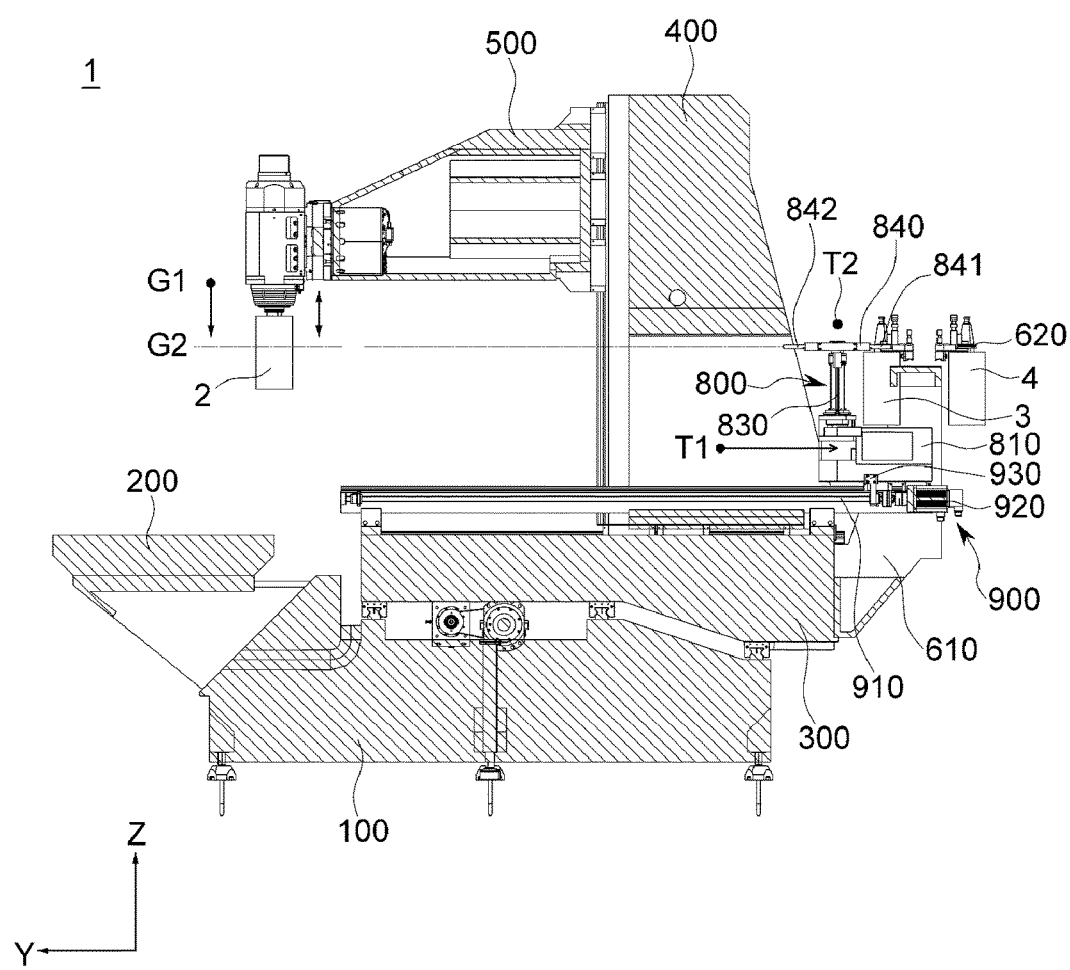
FIG. 5, FIG. 6, FIG. 7, FIG. 8, FIG. 9, FIG. 10, FIG. 11, FIG. 12, FIG. 13 and FIG. 14 are conceptual views illustrating a process of operating the machine tool according to the embodiment of the present disclosure.

As illustrated in FIG. 5, when it is necessary to replace the processing tool 2 mounted on the spindle 500 with the standby tool 3 accommodated in the gripper 620 of the magazine 600, the tool changing unit 800 is rectilinearly moved by the tool changing unit transfer part 900 from the initial position T1 to the standby position T2 independently of the column 400, and the first gripping part 841 of the change arm 840 grips the standby tool 3 to change the tools.

Figure 7:
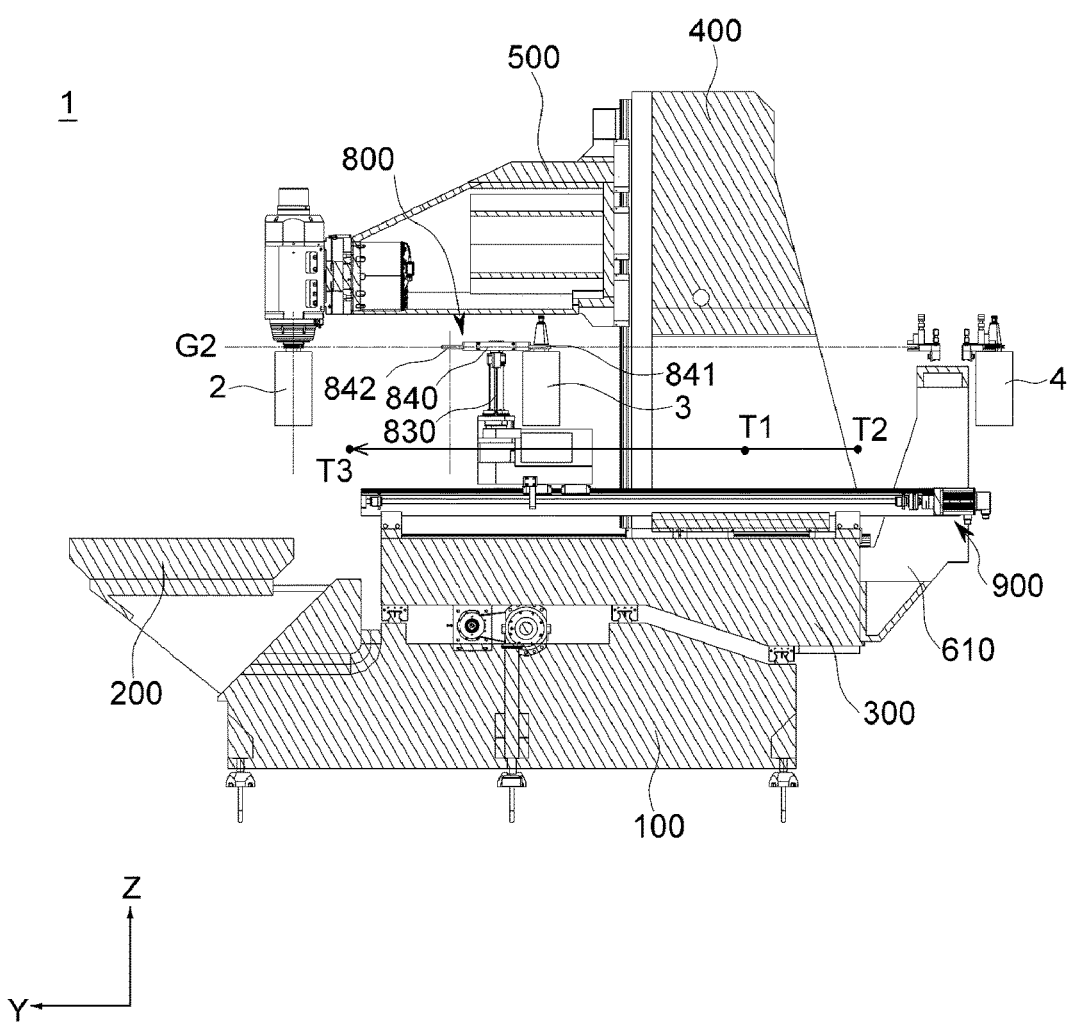

As illustrated in FIG. 7, in the state in which the first gripping part 841 of the change arm 840 grips the standby tool 3, the tool changing unit 800 rectilinearly moves from the standby position T2 to the change position T3 as the tool changing unit transfer part 900 operates based on the signal from the control part 1000.

Figure 6:
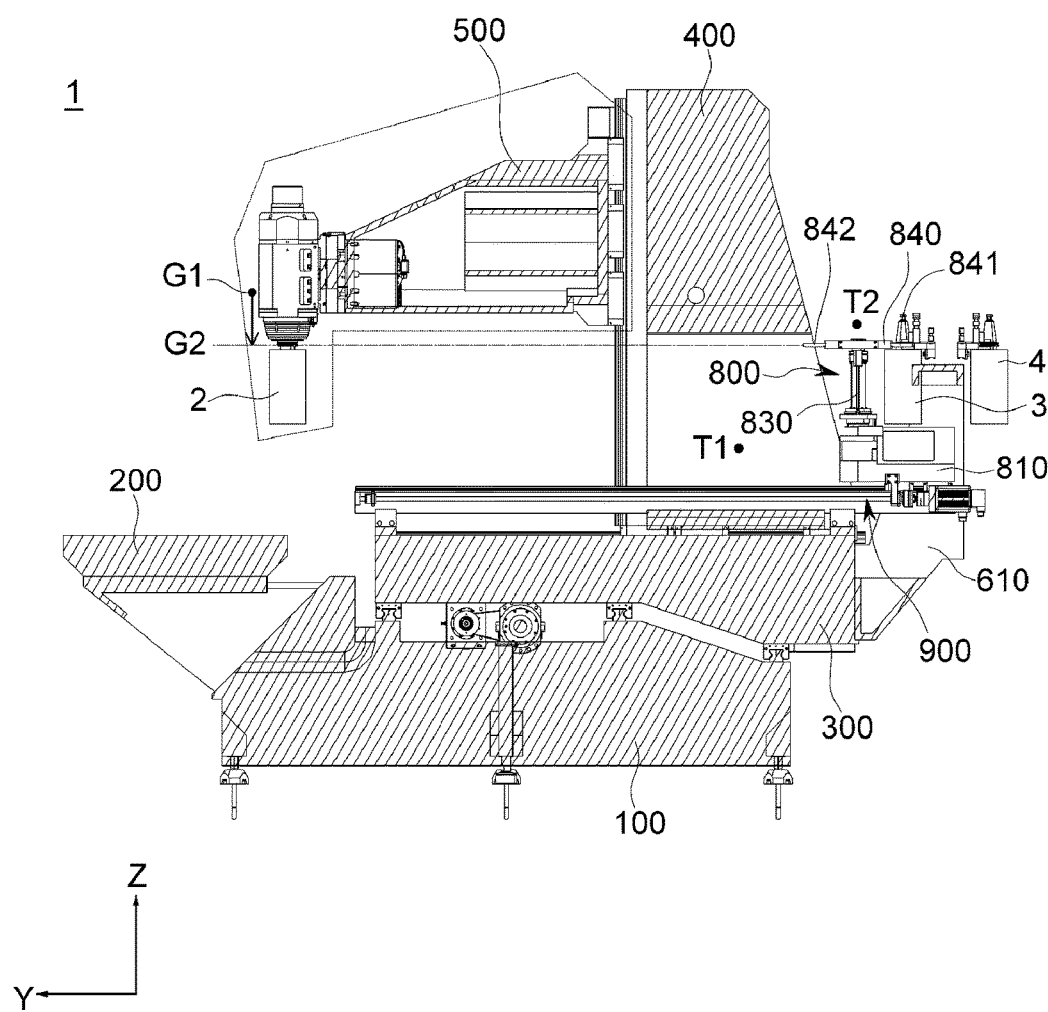

As illustrated in FIG. 6, when the tool changing unit 800 moves from the standby position to the change position, the spindle 500 moves downward to the lower spindle gripping position G2 so that the second gripping part 842 of the change arm grips the processing tool 2.

Figure 8:
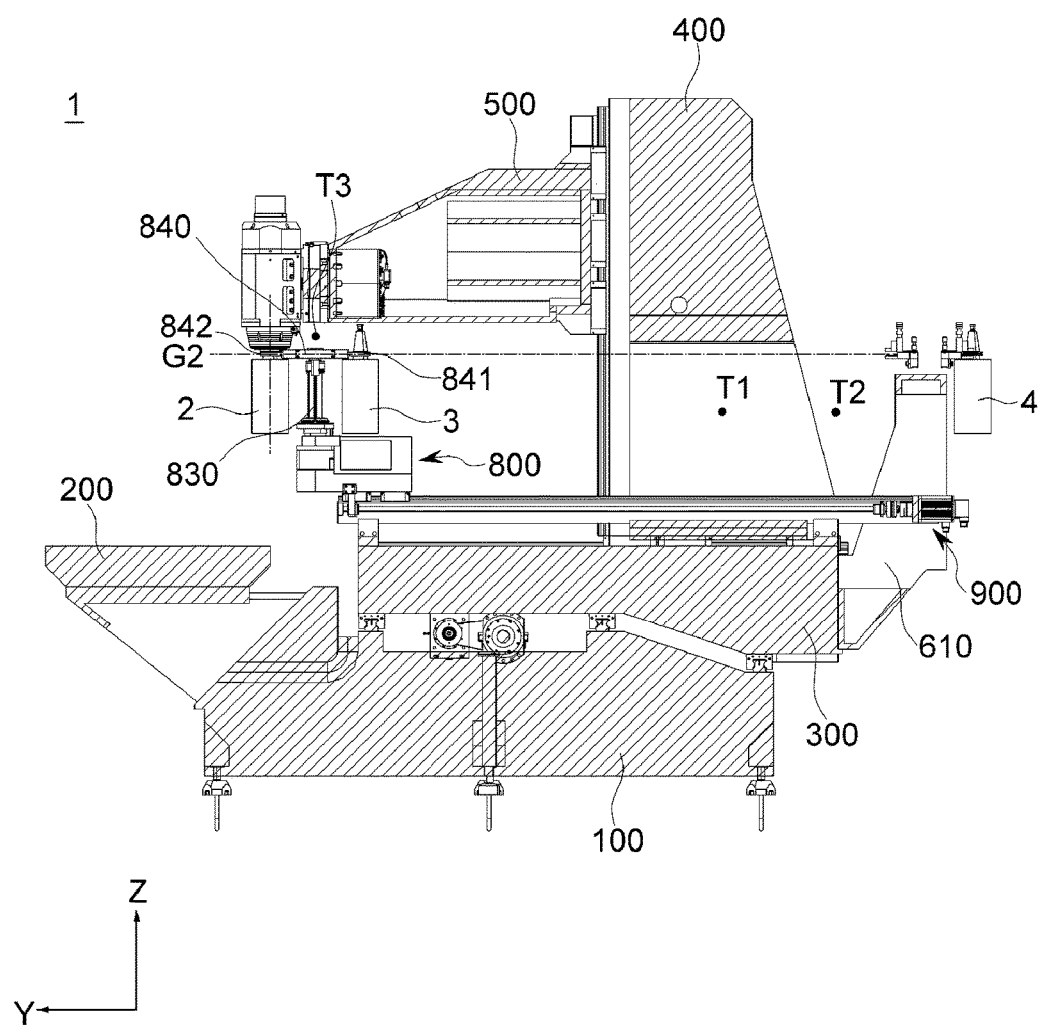

Thereafter, as illustrated in FIG. 8, when the second gripping part 842 of the change arm of the tool changing unit 800 grips the processing tool 2 at the change position, the spindle 500 moves upward to the upper spindle gripping position G1 so that the spindle 500 unclamps the processing tool.

Figure 10:
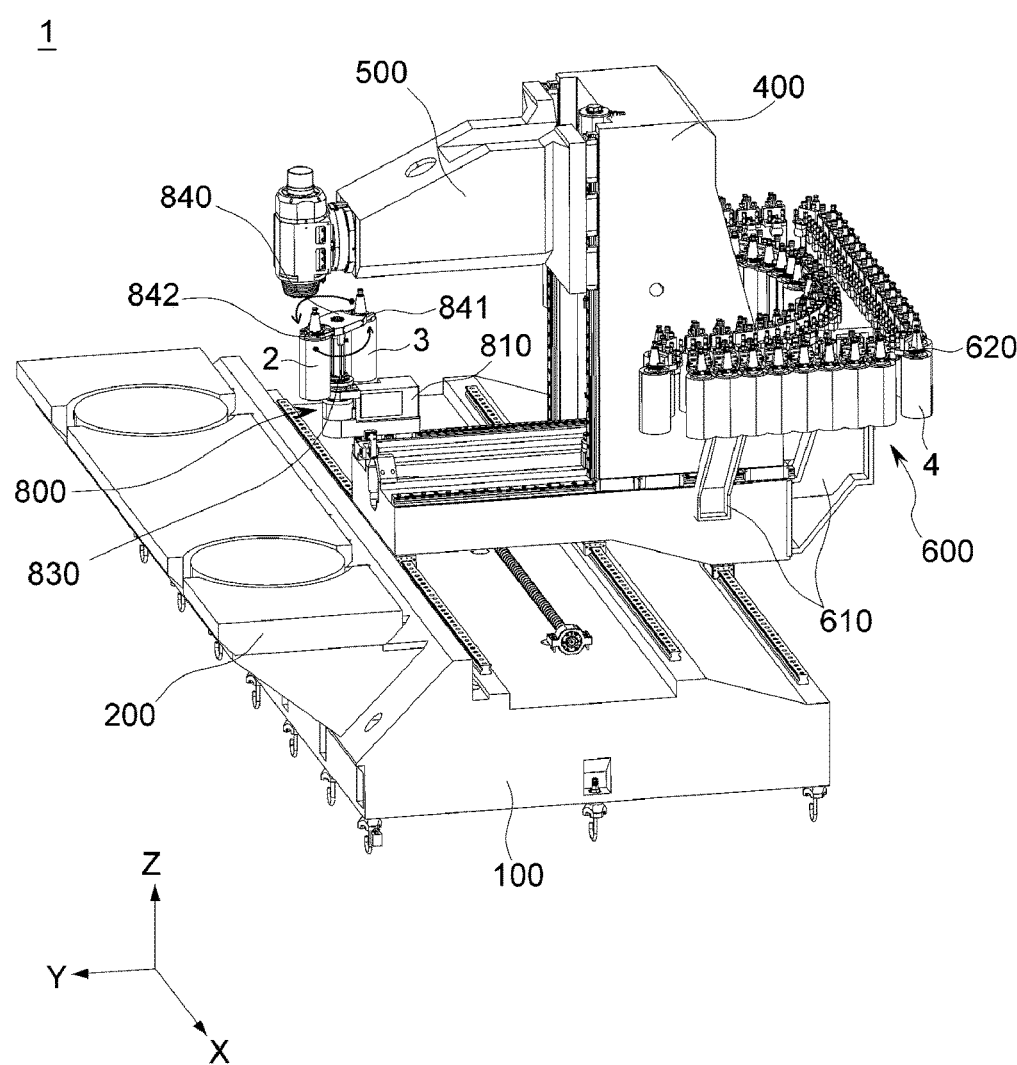
Figure 11:
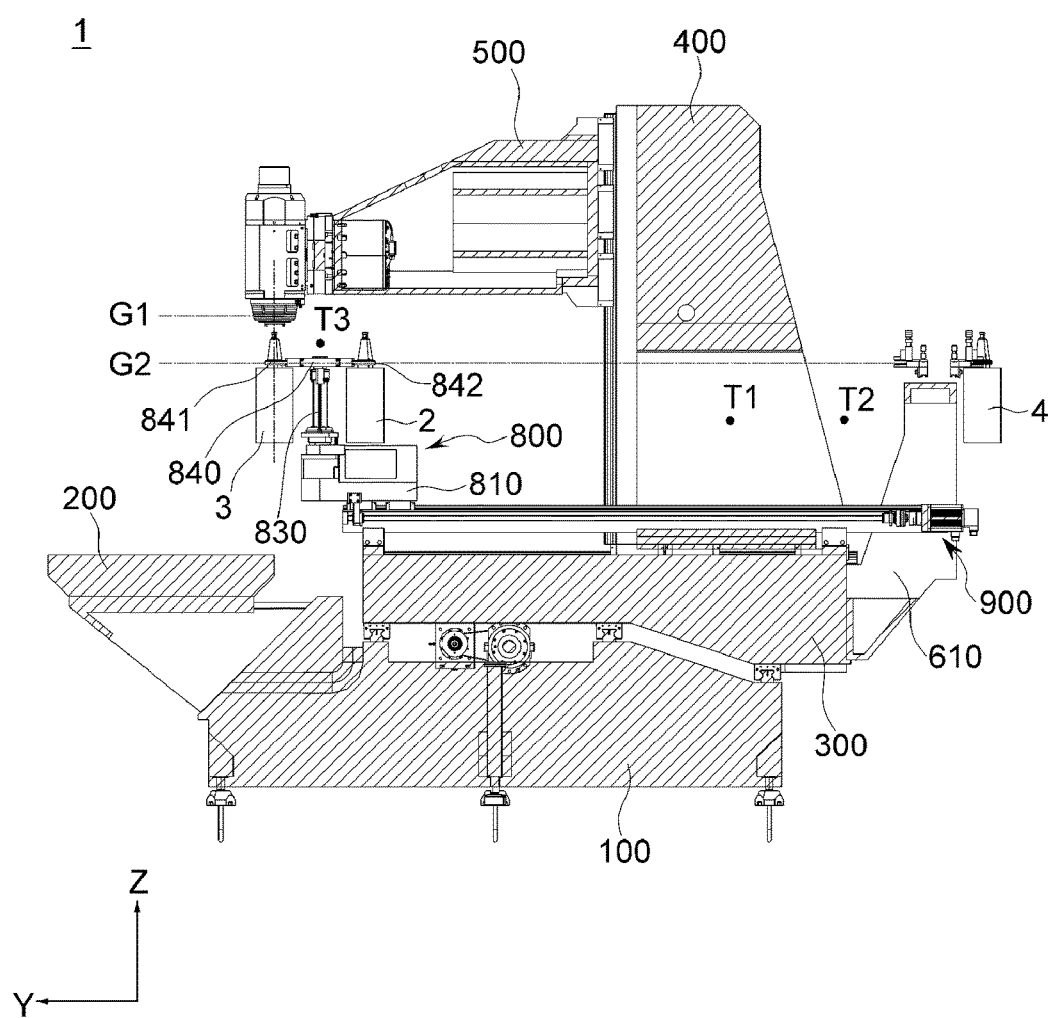

Thereafter, as illustrated in FIGS. 10 and 11, the second gripping part 842 of the change arm grips the processing tool 2 unclamped from the spindle 500, and the change arm 840 of the tool changing unit 800 rotates based on the signal from the control part 1000 to replace the processing tool with the standby tool after the spindle 500 moves upward to the upper gripping position G1.

Figure 12:
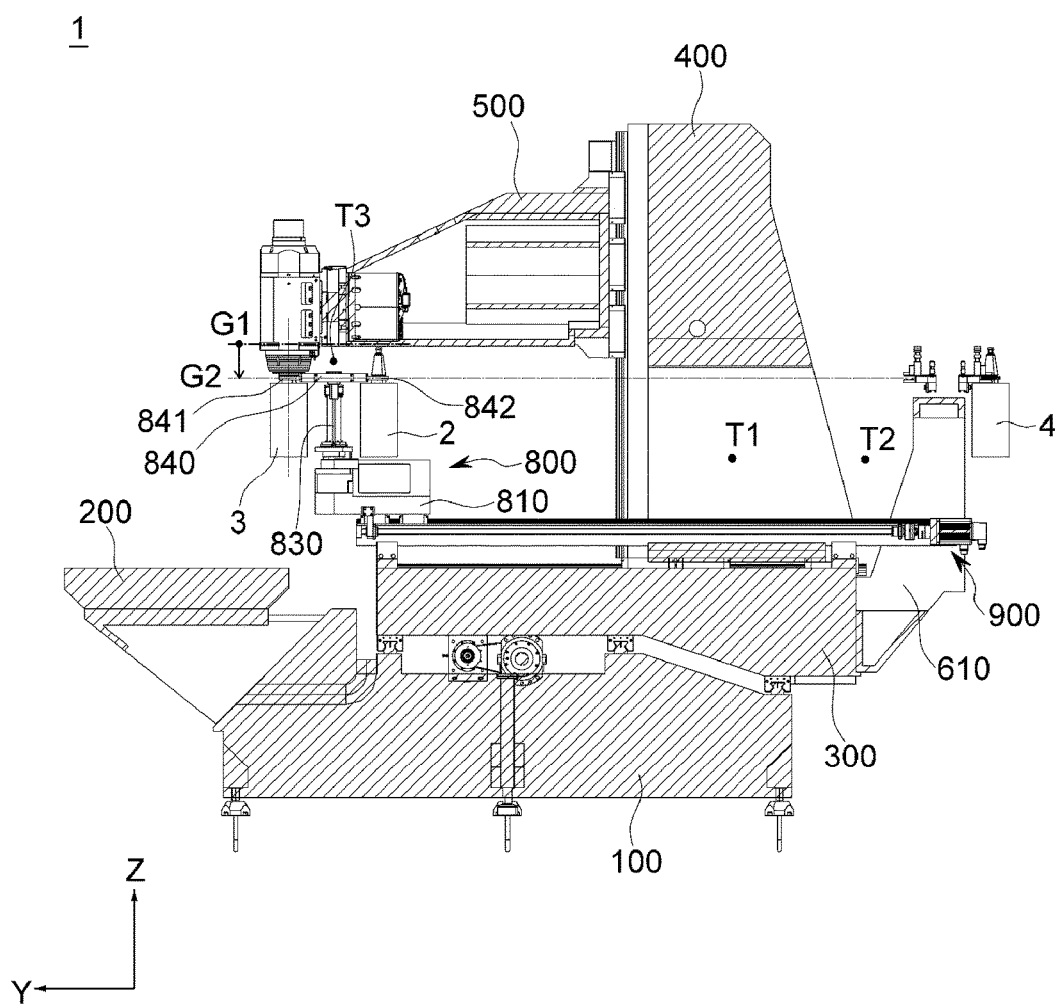

Thereafter, as illustrated in FIG. 12, the spindle 500 moves downward to the lower spindle gripping position G2 to clamp the standby tool 3 gripped by the first gripping part 841 of the change arm.

Thereafter, the spindle 500 moves upward to the upper spindle gripping position G1 to clamp the standby tool. That is, the spindle moves downward to the gripping position and clamps the tool, and then the spindle moves upward after the tool changing unit departs from an interference position in order to prevent a collision between the spindle and the tool changing unit.

Figure 13:
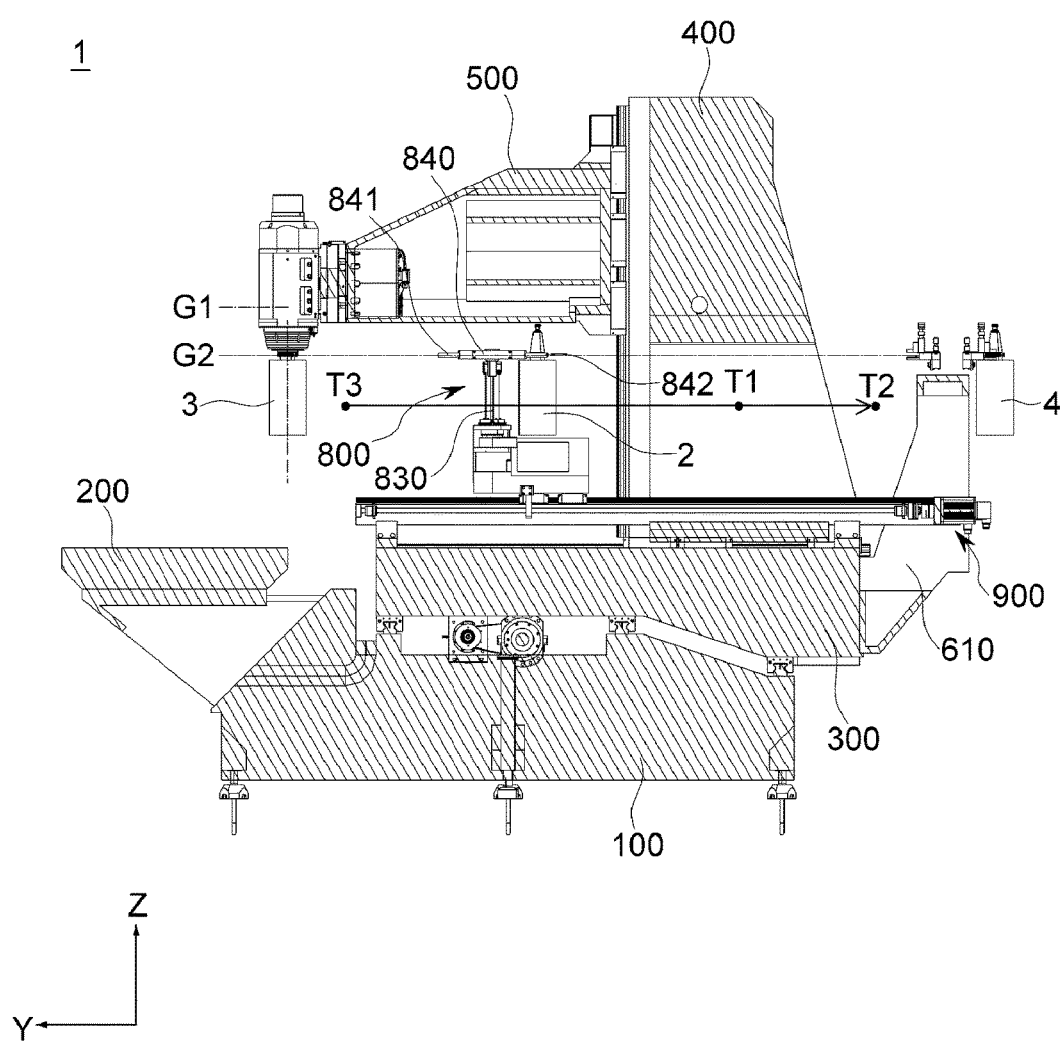

Thereafter, as illustrated in FIG. 13, the tool changing unit 800 rectilinearly moves from the change position T3 to the standby position T2 based on the signal from the control part 1000 to return the processing tool 2, which is gripped by the second gripping part 842 of the change arm, to the gripper of the magazine. As a result, in order to prevent the tool changing unit, the tool, or the spindle from being damaged or broken, the spindle moves downward, the tool changing unit moves, and the spindle moves upward in accordance with the movement to tool changing unit.

Figure 14:
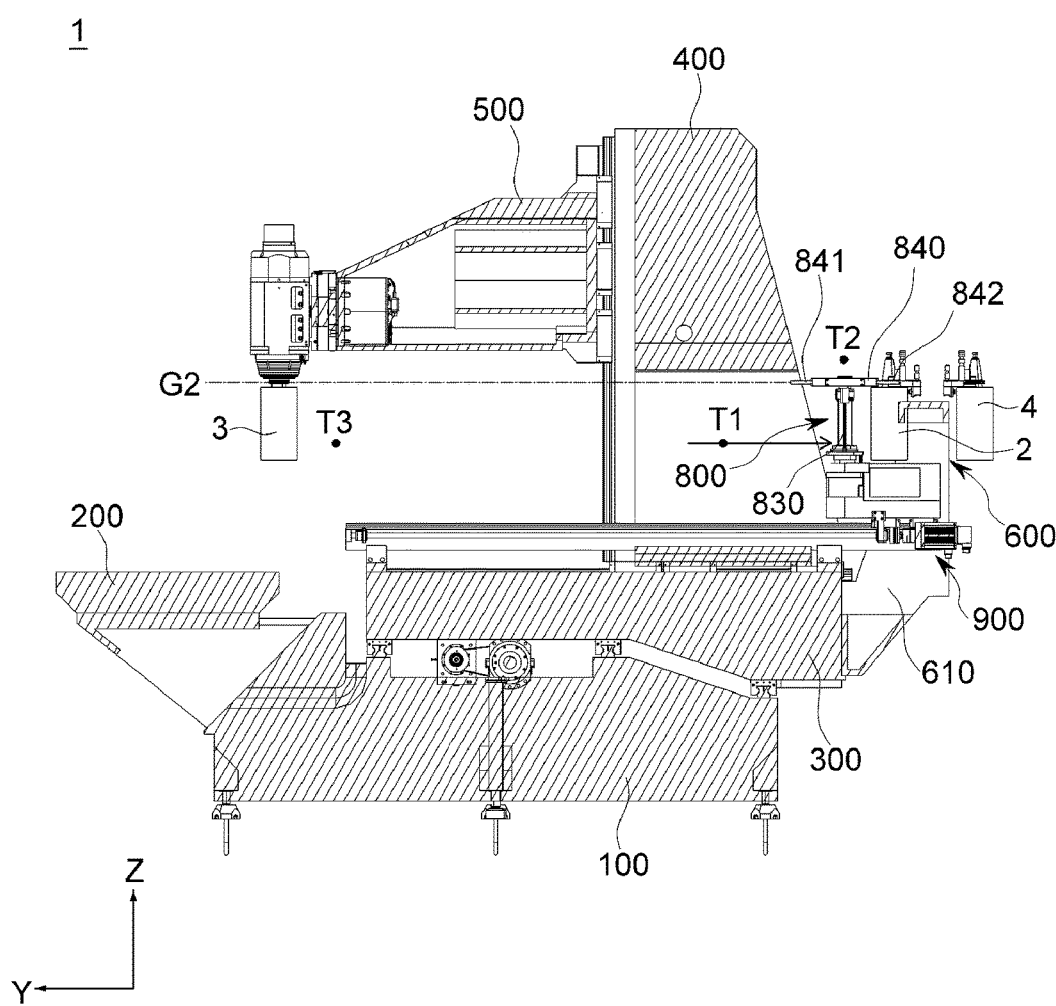

Thereafter, as illustrated in FIG. 14, the tool changing unit 800 returns the processing tool, which is gripped by the second gripping part 842 of the change arm, to the gripper of the magazine only by rectilinearly moving.

Thereafter, as illustrated in FIGS. 4 and 14, the tool changing unit 800, which has returned the standby tool, rectilinearly moves to the initial position T1 based on the signal from the control part 1000, and the spindle 500 performs a subsequent process with the standby tool 3 clamped by the spindle 500 based on the sequence of the machining program.

The method and principle of operating the machine tool according to the embodiment of the present disclosure will be described in more detail with reference to FIG. 17.

The machining program storage part stores the workpiece machining program for replacing the processing tool 2 mounted on the spindle 500 with the standby tool 3 accommodated in the gripper 620 of the magazine, the tool changing unit position storage part stores the initial position T1, the standby position T2, and the change position T3 of the tool changing unit, and the spindle gripping position storage part stores the upper spindle gripping position G1 and the lower spindle gripping position G2 of the spindle (first step).

After the first step, a workpiece is machined based on the machining program, as illustrated in FIGS. 4 and 17 (second step).

After the second step, as illustrated in FIG. 4, the tool changing unit 800 is on standby at the initial position T1 between the upper portion of the saddle and the column while the spindle machines the workpiece based on the machining program, and the gripper of the magazine, which accommodates the standby tool 3 to be used for the subsequent process is positioned on standby at the standby position based on the machining program (third step).

After the third step, in the sequence in which the workpiece is machined based on the machining program, the control part transmits a tool change command to the magazine, the transfer part, and the tool changing unit transfer part (fourth step).

After the fourth step, as illustrated in FIGS. 5, 6, 7, and 17, the tool changing unit 800 rectilinearly moves from the initial position T1 to the standby position T2 based on the tool change command, the first gripping part 841 of the change arm grips the standby tool 3, and the tool changing unit rectilinearly moves from the standby position T2 to the change position T3 by the tool changing unit transfer part (fifth step).

After the fifth step, as illustrated in FIGS. 6 and 17, the spindle moves downward to the lower spindle gripping position G2 so that the second gripping part 842 of the change arm grips the processing tool 2 clamped by the spindle 500 (sixth step).

Figure 9:
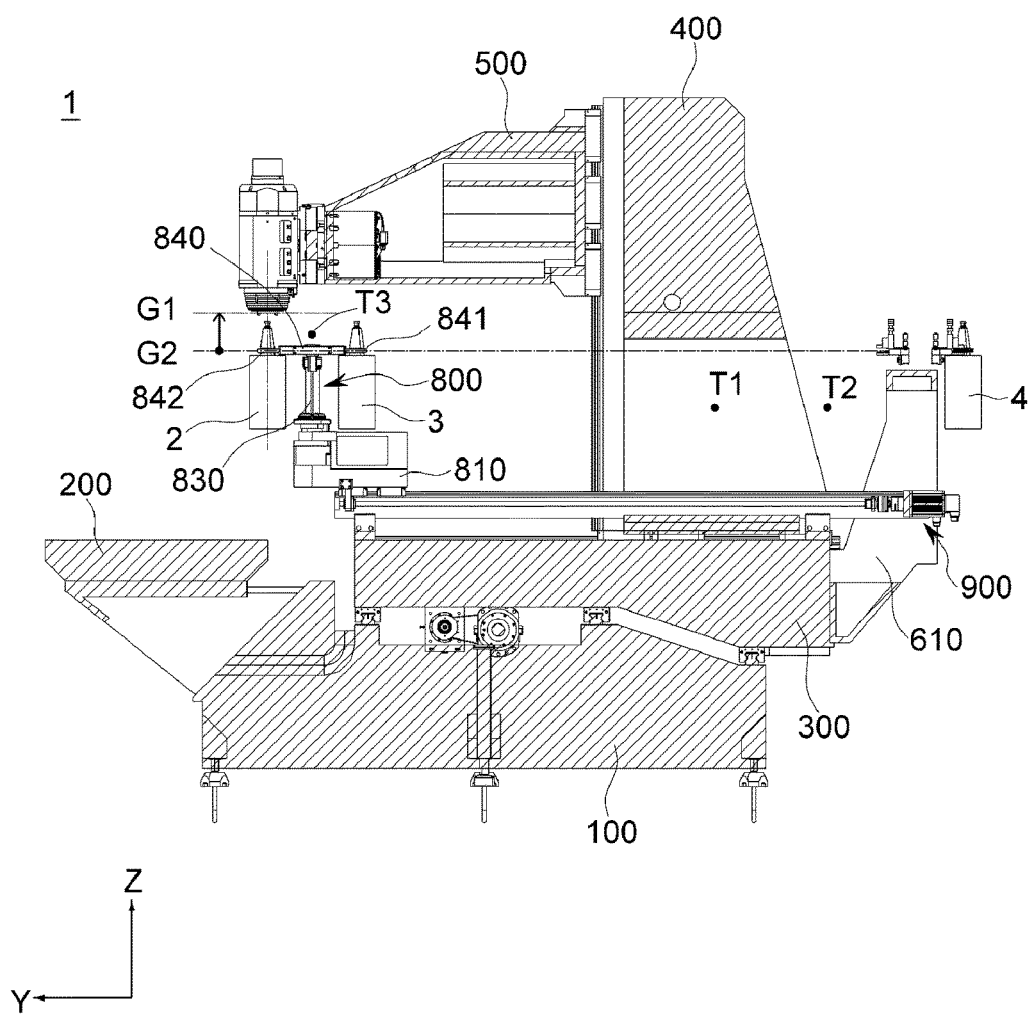

After the sixth step, as illustrated in FIGS. 9 and 17, the spindle clamps the standby tool 3 accommodated in the first gripping part 841 of the change arm and moves upward to the upper spindle gripping position G1 after unclamping the processing tool in order to prevent damage caused by a collision (seventh step).

After the seventh step, as illustrated in FIGS. 10, 11, and 17, the change arm 840 rotates to transfer the standby tool 3, which is accommodated in the first gripping part 841 of the change arm, to the spindle (eighth step).

After the eighth step, as illustrated in FIGS. 12 and 17, the spindle 500 moves again downward to the lower spindle gripping position G2 to clamp the standby tool 3 accommodated in the first gripping part 841 of the change arm (ninth step).

After the ninth step, as illustrated in FIGS. 13 and 17, the tool changing unit 800 rectilinearly moves from the change position T3 to the standby position T2 to return the processing tool 2, which is gripped by the second gripping part 842 of the change arm, to the gripper 620 of the magazine (tenth step).

After the tenth step, the spindle moves again upward to the upper spindle gripping position in the state in which the spindle clamps the standby tool in order to prevent the tool or the machine tool from being damaged or broken due to a collision (eleventh step).

After the eleventh step, as illustrated in FIGS. 3, 4, and 17, the tool changing unit 800 rectilinearly moves from the standby position T2 to the initial position T1 after returning the processing tool 2, which is gripped by the second gripping part 842 of the change arm, to the gripper 620 of the magazine (twelfth step).

After the twelfth step, the spindle performs the subsequent process with the standby tool clamped by the spindle based on the sequence of the machining program (thirteenth step).

Accordingly, according to the machine tool and the method of operating the same according to the present disclosure, the tool changing unit only rectilinearly reciprocates and rotates, and the spindle performs an inherent function of moving upward and downward in the height direction to change the tools. Therefore, the tool changing unit may be small in size, and the tool changing unit may quickly move, thereby reducing the non-machining time, reducing vibration and noise generated while the machine tool moves, increasing the lifespan of the machine tool, and maximizing the machining precision.

In addition, the machine tool and the method of operating the same according to the present disclosure may reduce the likelihood of interference or collision by minimizing the movement distance required to change the tools, thereby improving the stability and reliability of the machine tool.

While the present disclosure has been described above with reference to the exemplary embodiments of the present disclosure in the detailed description of the present disclosure, it may be understood, by those skilled in the art or those of ordinary skill in the art, that the present disclosure may be variously modified and changed without departing from the spirit and scope of the present disclosure disclosed in the claims. Accordingly, the technical scope of the present disclosure should not be limited to the contents disclosed in the detailed description of the specification but should be defined only by the claims.

The invention claimed is:

1. A machine tool comprising:
a bed;
a table installed on the bed, the table being configured to allow a workpiece to be seated thereon for machining;
a saddle movably installed on the bed, the saddle being movable on the bed in a first linear direction;
a column movably installed on the saddle, the column being movable on the saddle in a second linear direction, the second linear direction extending perpendicular to the first linear direction;
a spindle movably installed on the column, the spindle being configured to machine the workpiece, the spindle being movable on the column in a third linear direction, the third linear direction extending perpendicular to both the first linear direction and the second linear direction;
a tool magazine having a plurality of grippers, the plurality of grippers being configured to accommodate tools that are to be supplied to the spindle;
a transferer configured to move the saddle, the column, and the spindle; and
a tool changer movably installed on the saddle, the tool changer being movable on the saddle in the second linear direction and being movable on the saddle through an opening of the column such that the tool changer replaces a first tool mounted on the spindle with a second tool accommodated in one of the plurality of grippers of the tool magazine,
wherein the tool magazine is installed on the saddle and moves together with the saddle when the saddle moves.

2. The machine tool of claim 1, further comprising:
a tool changing unit transferer installed on the saddle to move the tool changer over the saddle.

3. The machine tool of claim 2, further comprising:
a control part configured to control operations of each of the tool magazine, the tool changer, the tool changing unit transferer, and the transferer in order to replace the first tool mounted on the spindle with the second tool accommodated in the one of the plurality of grippers of the tool magazine.

4. The machine tool of claim 3, wherein the control part comprises:
a machining program storage part configured to store a machining program for machining the workpiece;
a tool changing unit position storage part configured to store an initial position, a standby position, and a change position of the tool changer;
a spindle gripping position storage part configured to store a gripping position of the spindle in accordance with upward and downward movements of the spindle;
and a tool change commander configured to transmit a tool change command in a sequence in which the workpiece is machined while communicating with the machining program storage part, the tool changing unit position storage part, and the spindle gripping position storage part.

5. The machine tool of claim 4, wherein the control part further comprises:
a determiner configured to determine whether the spindle normally clamps or unclamps the second tool and the first tool when changing the first and second tools based on a signal from the tool change commander.

6. The machine tool of claim 5,
wherein the tool changer is on standby at the initial position between an upper portion of the saddle and the column and adjacent the one of the plurality of grippers of the tool magazine, and the tool changer is positioned at the standby position while the spindle machines the workpiece, and
wherein the one of the plurality of grippers accommodates the second tool to be used for a subsequent process based on the machining program.

7. The machine tool of claim 3, wherein the tool changer rectilinearly moves and rotates above the saddle and the spindle moves upward and downward to unclamp the first tool and clamp the second tool in order to replace the first tool mounted on the spindle with the second tool accommodated in the one of the plurality of grippers of the tool magazine.

8. The machine tool of claim 3, wherein the transferer comprises:
a saddle transferer installed on the bed to move the saddle;
a column transferer installed on the saddle to move the column; and
a spindle transferer installed on the column to move the spindle.

9. The machine tool of claim 4, wherein the tool changing unit transferer rectilinearly reciprocates the tool changer between the standby position and the change position above the saddle through the opening of the column independently of the column.

10. The machine tool of claim 4, wherein the tool changing unit transferer comprises:
a fourth ball screw installed on an upper portion of the saddle through the opening of the column and disposed in the second linear direction;
a driver part configured to generate rotational power for the fourth ball screw;
a bracket part installed to be movable along the fourth ball screw by an operation of the driver part;
a fourth linear guide installed on the upper portion of the saddle through the opening of the column and disposed in the second linear direction of the saddle so as to be parallel to the fourth ball screw; and
a fourth linear guide block installed to be movable along the fourth linear guide.

11. The machine tool of claim 10, wherein the tool changer comprises:
a base part installed to be movable along the fourth linear guide by the fourth linear guide block and the bracket part;
a power part installed on the base part and configured to generate rotational power;
a shaft part configured to be rotated by the rotational power of the power part; and
a change arm installed at one side of the shaft part so as to be rotatable in conjunction with the shaft part and configured to grip the second tool accommodated in the tool magazine or the first tool mounted on the spindle by rectilinearly moving in the second linear direction above the saddle.

12. The machine tool of claim 11, wherein the change arm has a first gripper and a second gripper installed at two opposite ends of the change arm, the first gripper is configured to accommodate the second tool, and the second gripper is configured to grip the first tool.

13. The machine tool of claim 12, wherein the shaft part and the power part are installed to be orthogonal to each other, and the tool changer further comprises a conversion part installed at the other side of the shaft part to transmit the rotational power from the power part to the shaft part.

14. The machine tool of claim 12,
wherein to replace the first tool mounted on the spindle with the second tool accommodated in the one of the plurality of grippers of the tool magazine, the tool changer rectilinearly moves from the initial position to the standby position, the tool changer is rectilinearly moved from the standby position to the change position by the tool changing unit transferer in a state in which the first gripper of the change arm grips the second tool, the spindle moves downward to the gripping position so that the second gripper of the change arm grips the first tool, and the spindle moves upward after unclamping the first tool.

15. The machine tool of claim 14,
wherein the change arm of the tool changer rotates after the second gripper of the change arm grips the first tool on the spindle,
wherein the spindle moves downward to the gripping position to clamp the second tool gripped by the first gripper of the change arm and moves upward after the tool changer moves to the standby position, and
wherein the tool changer rectilinearly moves from the change position to the standby position to return the first tool, which is gripped by the second gripper of the change arm, to the gripper of the one of the plurality of grippers of the tool magazine.

16. The machine tool of claim 15,
wherein the tool changer rectilinearly moves to the initial position after returning the first tool, which is gripped by the second gripper of the change arm, to the tool magazine, and
wherein the spindle performs a subsequent process with the second tool clamped by the spindle in the sequence of the machining program.

17. A method of operating the machine tool of claim 1, the method comprising:
providing the machine tool of claim 1;
storing a workpiece machining program for replacing the first tool mounted on the spindle of the machine tool with the second tool accommodated in the one of the plurality of grippers of the tool magazine of the machine tool;
storing an initial position, a standby position, and a change position of the tool changer of the machine tool, and further storing a gripping position of the spindle;
machining a workpiece based on the machining program;
placing the tool changer on standby at the initial position between an upper portion of the saddle and the column of the machine tool;
positioning the one of the plurality of grippers of the tool magazine, which accommodates the second tool to be used for a subsequent process based on the machining program, at the standby position while the workpiece is machined based on the machining program;
transmitting a tool change command;
rectilinearly moving the tool changer from the initial position to the standby position based on the tool change command, gripping, by a first gripper of a change arm of the tool changer, the second tool, and rectilinearly moving the tool changer to the change position;
moving the spindle downward to the gripping position to allow a second gripper of the change arm to grip the first tool clamped by the spindle;
moving the spindle upward after unclamping the first tool;
rotating the change arm to transfer the second tool, which is accommodated in the first gripper of the change arm, to the spindle;
moving the spindle downward again to the gripping position to clamp the second tool accommodated in the first gripper of the change arm;
rectilinearly moving the tool changer to the standby position to return the first tool, which is gripped by the second gripper of the change arm, to the one of the plurality of grippers of the tool magazine;
moving the spindle upward again in a state in which the spindle clamps the second tool;
rectilinearly moving the tool changer to the initial position after returning the first tool, which is gripped by the second gripper of the change arm, to the tool magazine; and
performing, by the spindle, a subsequent process with the second tool clamped by the spindle in a sequence of the machining program.

* * * * *